United States Patent
Weckx et al.

(10) Patent No.: US 11,704,462 B2
(45) Date of Patent: Jul. 18, 2023

(54) COMPLEXITY-REDUCED SIMULATION OF CIRCUIT RELIABILITY

(71) Applicants: IMEC vzw, Leuven (BE); Katholieke Universiteit Leuven, Leuven (BE)

(72) Inventors: Pieter Weckx, Vaalbeek (BE); Dimitrios Rodopoulos, Athens (GR); Benjamin Kaczer, Leuven (BE); Francky Catthoor, Temse (BE)

(73) Assignees: IMEC vzw, Leuven (BE); Katholieke Universiteit Leuven, Leuven (BE)

( * ) Notice: Subject to any disclaimer, the term of this patent is extended or adjusted under 35 U.S.C. 154(b) by 912 days.

(21) Appl. No.: 16/522,555

(22) Filed: Jul. 25, 2019

(65) Prior Publication Data
US 2020/0089829 A1    Mar. 19, 2020

Related U.S. Application Data

(63) Continuation of application No. 15/081,635, filed on Mar. 25, 2016, now abandoned.

(60) Provisional application No. 62/139,267, filed on Mar. 27, 2015.

(51) Int. Cl.
*G06F 30/367* (2020.01)

(52) U.S. Cl.
CPC ................. *G06F 30/367* (2020.01)

(58) Field of Classification Search
CPC ............... G06F 30/367; G06F 2119/04; G06F 2119/08; G06F 2119/10; G06F 30/20; G06F 30/3323; G06F 2111/08
See application file for complete search history.

(56) References Cited

U.S. PATENT DOCUMENTS

| | | |
|---|---|---|
| 2005/0004833 A1 | 1/2005 | Mcrae et al. |
| 2009/0024378 A1 | 1/2009 | Dierickx et al. |
| 2013/0031523 A1 | 3/2013 | Foreman et al. |
| 2013/0212414 A1* | 8/2013 | Bansal .................. G06F 30/327 713/320 |

FOREIGN PATENT DOCUMENTS

CN    105493406 A  *  4/2016  ............. H03K 3/017

OTHER PUBLICATIONS

Rodopoulos et al. "Understanding Timing Impact of BTI/RTN with Massively Threaded Atomistic Transient Simulations". IEEE International Conference on IC Design and Technology—ICICDT, Date: Jan. 1, 2014-Jan. 5, 2014. 5 Pages. (Year: 2014).*

(Continued)

*Primary Examiner* — Eunhee Kim
(74) *Attorney, Agent, or Firm* — Knobbe Martens Olson & Bear LLP

(57) ABSTRACT

A system and method for simulating an electronic circuit is disclosed. The method includes creating a finite set of circuit or device parameter points selected from within an n-dimensional parameter space. The method includes determining, for each circuit or device parameter point of the set, a corresponding response value of the performance metric and a corresponding probability of occurrence. The method includes determining, for a predetermined value of the performance metric, the total probability of occurrence.

16 Claims, 30 Drawing Sheets

(56) References Cited

OTHER PUBLICATIONS

Weckx et al. "Defect-based Methodology for Workload-dependent Circuit Lifetime Projections—Application to SRAM". 2013 IEEE. 7)Pages. (Year: 2013).*

Weckx P, Kaczer B, Toledano-Luque M, Grasser T, Roussel PJ, Kukner H, Raghavan p. Catthoor F, Groeseneken G. Defect-based methodology for workload-dependent circuit lifetime projections-Application to SRAM. In2013 IEEE International Reliability Physics Symposium (IRPS) Apr. 14, 2013 (pp. 3A-4). IEEE. (Year: 2013).*

Jeong, C. H., Abdullah, A., Min, Y. J., Hwang, I. C., & Kim, S. W. (2015). All-digital duty-cycle corrector with a wide duty correction range for DRAM applications. IEEE Transactions on Very Large Scale Integration (VLSI) Systems, 24(1), 363-367. (Year: 2015).*

Kaczer, B., et al., "Origin of NBTI variability in deeply scaled pFETs", 2010 IEEE International Reliability Physics Symposium (IRPS), May 2-6, 2010, pp. 2A.3.1-2A.3.7.

Kaczer, B., et al., Atomistic approach to variability of bias-temperature instability in circuit simulations, Proc. IEEE IRPS, 2011, pp. XT.3.1-XT.3.5.

Seevinck, E., et al. in "Static-noise margin analysis of MOS SRAM cells", Solid-State Circuits, IEEE Journal of Solid State Circuits, vol. SC-22, No. 5, pp. 748-754, Oct. 1987.

Toledano-Luque, M., et al., "Response of a single trap to AC negative bias temperature stress", Proc. IEEE IRPS, 2011, pp. 4A.2.1-4A.2.8.

Vaidyanathan, B., et al., "Technology Scaling Effect on the Relative Impact of NBTI and Process Variation on the Reliability of Digital Circuits", IEEE Transactions on Device and Materials Reliability, vol. 12, No. 2, pp. 428-436, Jun. 2012.

The 90 nm predictive technology model, downloaded from http://ptm.asu.edu/modelcard/2006/90nm_bulk.pm, May 2013.

Aadithya, Karthik V., et al. "SAMURAI: An accurate method for modelling and simulating non-stationary random telegraph noise in SRAMs." *2011 Design, Automation & Test in Europe*. IEEE, 2011.

Giering, Kay-Uwe, et al. "NBTI modeling in analog circuits and its application to long-term aging simulations." 2014 IEEE International Integrated Reliability Workshop Final Report (IIRW). IEEE, 2014.

Goel, N., et al. "Impact of time-zero and NBTI variability on sub-20nm FinFET based SRAM at low voltages." *2015 IEEE International Reliability Physics Symposium*. IEEE, 2015.

Grasser, T., et al. "Analytic modeling of the bias temperature instability using capture/emission time maps." *2011 International Electron Devices Meeting*. IEEE, 2011.

Kaczer, Ben, et al. "Atomistic approach to variability of bias-temperature instability in circuit simulations." *2011 International Reliability Physics Symposium*. IEEE, 2011.

Kufluoglu, Haldun, et al. "An extensive and improved circuit simulation methodology for NBTI recovery." *2010 IEEE International Reliability Physics Symposium*. IEEE, 2010.

Martin-Martinez, J., et al. "Probabilistic defect occupancy model for NBTI." *2011 International Reliability Physics Symposium*. IEEE, 2011.

Reisinger, Hans, et al. "Understanding and modeling AC BTI." *2011 International Reliability Physics Symposium*. IEEE, 2011.

Reisinger, Hans, et al. "The statistical analysis of individual defects constituting NBTI and its implications for modeling DC-and AC-stress." *2010 IEEE International Reliability Physics Symposium*. IEEE, 2010.

Rodopoulos, Dimitrios, et al. "Atomistic pseudo-transient BTI simulation with inherent workload memory." *IEEE Transactions on Device and Materials Reliability* 14.2 (2014): 704-714.

Stamoulis, Dimitrios, et al. "Capturing true workload dependency of BTI-induced degradation in CPU components." *2016 International Great Lakes Symposium on VLSI(GLSVLSI)*. IEEE, 2016.

Wang, Wenping, et al. "The impact of NBTI effect on combinationa I circuit: modeling, simulation, and analysis." *IEEE Transactions on Very Large Scale Integration (VLSI) Systems* 18.2 (2009): 173-183.

Weckx, P., "Coping with time-dependent variability by a combined design and technology co-optimization." Dissertation presented in partial fulfillment of the requirements for the degree of Doctor in Engineering, KU Leuven Arenberg Doctoral School Faculty of Engineering Science, Jun. 2016.

Weckx, Pieter, et al. "Defect-based methodology for workload-dependent circuit lifetime projections—Application to SRAM." *2013 IEEE International Reliability Physics Symposium (IRPS)*. IEEE, 2013.

Ye, Yun, Chi-Chao Wang, and Yu Cao. "Simulation of random telegraph noise with 2-stage equivalent circuit." *2010 IEEE/ACM International Conference on Computer-Aided Design (ICCAD)*. IEEE, 2010.

Yilmaz, Cenk, et al. "Modeling of NBTI-recovery effects in analog CMOS circuits." *2013 IEEE International Reliability Physics Symposium (IRPS)*. IEEE, 2013.

Zhao, K., et al. "PBTI under dynamic stress: From a single defect point of view." *2011 International Reliability Physics Symposium*. IEEE, 2011.

\* cited by examiner

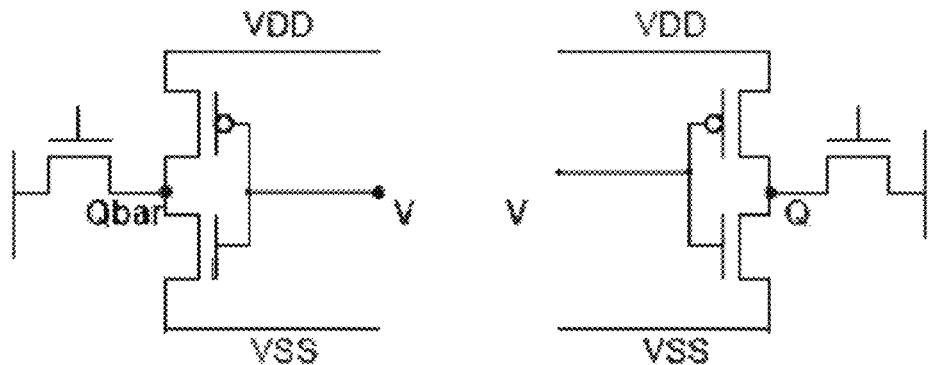
FIG. 7A  FIG. 7B
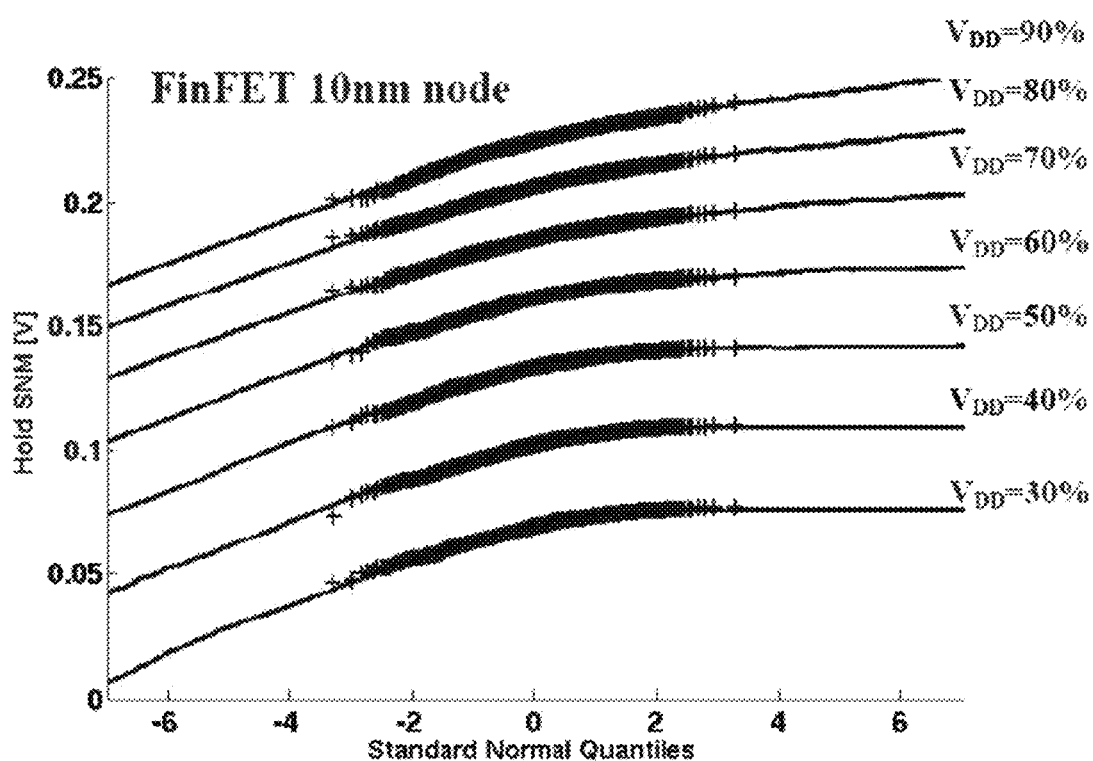
FIG. 8

$\tau_{cH}=1.0e-003,\quad \tau_{cL}=1.0e+007,\quad \tau_{eH}=1.0e-001,\quad \tau_{eL}=1.0e-002$ $\tau_{cH}=1.0e-005,\quad \tau_{cL}=1.0e+007,\quad \tau_{eH}=1.0e-003,\quad \tau_{eL}=1.0e-004$ $\tau_{cH}=1.0e-011,\quad \tau_{cL}=1.0e+007,\quad \tau_{eH}=1.0e-009,\quad \tau_{eL}=1.0e-010$

COMPLEXITY-REDUCED SIMULATION OF CIRCUIT RELIABILITY

RELATED APPLICATIONS

This application is a continuation of U.S. patent application Ser. No. 15/081,635, filed on Mar. 25, 2016, now abandoned, which claims the benefit of priority to U.S. Provisional Patent Application No. 62/139,267, filed on Mar. 27, 2015, both of which are incorporated herein by reference in their entirety.

BACKGROUND

Technological Field

The disclosed technology relates to simulation of electronic circuits under variability, in particular to the simulation of large circuits over extended lifetimes, where the variability is dependent on the workload condition (e.g., voltage and temperature sequence).

Description of the Related Technology

As semiconductor devices scale to smaller and smaller dimensions, various time-varying phenomena impact reliability. Example phenomena include bias temperature instability (BTI), random telegraph noise (RTN) and hot-carrier injection (HCI). Each phenomena has a partly stochastic and a partly deterministic basis, because each depends upon random events at the atomic level, but the probability of the events partly depends on operating conditions, such as voltage and temperature, and their particular sequence. Their effects tend to accumulate over the operating life of the devices, gradually degrading device characteristics and circuit performance.

For example, bias temperature instability (BTI) attracted significant attention from the reliability community. The downscaling trend observed in the semiconductor industry has gradually been changing the perception of BTI and the underlying modeling requirements. Earlier, an atomistic approach towards BTI has been proposed, based on the capture and emission of minority carriers at local states of the gate stack. The model additionally captures the effect of random telegraph noise (RTN), which also causes threshold voltage $V_{th}$ fluctuations. Using first order kinetics, the occupancy of gate stack defects is followed and the impact on a FET's $V_{th}$ is modeled. This model equally addresses pFETs (NBTI, negative BTI) and nFETs (PBTI, positive BTI).

Recent advances in understanding bias temperature instability (BTI), for example in terms of individual gate oxide defects, created a paradigm shift towards describing degradation in terms of time-dependent variability. This time dimension added to the variability analysis has proven to be a considerable design challenge. Moreover, the non-normally distributed threshold voltage shifts ($\Delta V_{TH}$) create compatibility issues with the current statistical assessment techniques for evaluating high sigma yield of large circuits, as in the case of static random-access memory (SRAM) cells.

The time-dependent variability of electronic devices results in degradation over time of one or more performance metrics of a circuit containing such devices.

Contrary to the initial time-zero $V_{TH}$ distribution, time dependent $\Delta V_{TH}$ distributions, induced by bias temperature instability (BTI) and random telegraph noise (RTN), have been shown to deviate from a normal distribution already far below 66; see for instance Vaidyanathan B. et al., "Technology Scaling Effect on the Relative Impact of NBTI and Process Variation on the Reliability of Digital Circuits", IEEE Transactions on Device and Materials Reliability, vol. 12, no. 2, pp. 428-436, June 2012. Theoretical formulation of the $\Delta V_{TH}$ distribution has been described by Kaczer B. et al. in "Origin of NBTI variability in deeply scaled pFETs", 2010 IEEE International Reliability Physics Symposium (IRPS), pp. 26-32, 2-6 May 2010, using a defect-centric picture. It has been observed that the $\Delta V_{TH}$ induced by the trapping of an individual oxide defect trap is exponentially distributed around the mean value η. The number of available traps is Poisson distributed with an average of $N_T$. By means of convolution, a closed form analytical description for the cumulative density function (CDF)

$$H_{\eta N_T} = (\Delta V_{TH}) = \sum_{n=0}^{\infty} \frac{e^{-N_T} N_T^n}{n!}\left[1 - \frac{n}{n!}\Gamma(n, \Delta V_{TH}/\eta)\right] \quad (1)$$

is obtained where the $\Delta V_{TH}$ distribution is fully described by the average impact per defect η and by the number of occupied defects $N_T$ with mean $$\mu_{\Delta V_{TH}}(t) = \langle \Delta V_{TH}(t) \rangle = \eta N_T \quad (2)$$

and variance $$\sigma_{\Delta V_{TH}}^2(t) = 2\eta \langle \Delta V_{TH}(t) \rangle = 2\eta \mu_{\Delta V_{TH}}(t) \quad (3)$$

Using correlations of statistical moments observed during measurements on pFETs, independently of the technology, the $\Delta V_{TH}$ variance $\sigma_{\Delta VTH}$ can be correlated to the initial time-zero variance $\sigma_{VTH0}$. Circuit simulation with degraded $V_{TH}$ distribution can as such be approximated by a normal distribution; however, resulting in discrepancies in the tail of the final distribution. Proper evaluation of the defect-centric distribution is therefore needed to assess the impact on the circuit performance at high quantiles.

Conventional industrial approaches like Monte Carlo (MC) simulation provide quantifiable and accurate results for arbitrary input distributions, but are generally far too slow for evaluating yields up to 5 to 6 sigma, since this would require ~100 billion simulations. Reducing the number of MC simulations and using extrapolation of the output distribution to reach higher sigmas can be inaccurate for drop-offs and discontinuities in the tail. Conventional high-sigma MC approaches, like quasi Monte Carlo, use a rejection based classifier to block the simulation of samples with high probability to end up in the bulk of the distribution. Importance sampling on the other hand will shift or weigh the input distribution to allow for more sampling in the tails. Such enhanced MC techniques can provide significant speed-up, but reduce the accuracy in the bulk of the distribution. Moreover, quantifiable verification is difficult to achieve for circuit or device parameter distributions other than normal or log-normal statistics.

Approaches other than MC, like worst case distance (WCD), use perturbation analysis to construct a linear model of the input to output mapping (response surface). The distance in input variable space between the nominal operation condition and the closest point of infeasibility is considered as the worst case distance and governs the yield. For highly non-linear response surfaces and non-normal input distributions this approach, however, falls short of correctly assessing the true yield. Creating a full analytical model of the problem is too time consuming and circuit specific, lacking flexibility. Finally, most probable failure point analysis can be employed; however, it strictly requires the circuit parameter function to be concave to yield any acceleration to the simulation's runtime.

SUMMARY OF CERTAIN INVENTIVE ASPECTS

The disclosed technology includes methods and devices for fast processor level simulation methodology, such as a fast (N/P) BTI simulation methodology. The disclosed technology further includes methods and devices for a non-Monte Carlo numerical simulation methodology capable of evaluating circuit performance under workload-dependent degradation, such as BTI degradation. The non-Monte Carlo methodology is presented for accurate evaluation at high sigma, capable of handling arbitrary circuit or device parameter distributions combined with non-analytical response surfaces.

A first aspect is a method for simulating an electronic circuit. The method includes creating a finite set of circuit or device parameter points, selected from within an n-dimensional parameter space. For each circuit or device parameter point of the set, the method includes determining a corresponding response value of the performance metric and a corresponding probability of occurrence; and determining, for a predetermined value of the performance metric, the total probability of occurrence. The finite set of circuit or device parameter points consists of a selection, hence a subset, of all possible circuit or device parameter points within the n-dimensional parameter space. The finite set thus includes less than all points in the parameter space. The finite set can be organized in a grid. The circuit or device parameter points of the finite set may be organized in a regular or in an irregular way. The circuit or device parameter points in the finite set can be organized in an equidistant way.

By creating a finite set of circuit or device parameter points, and only for these points, determining response values of the performance metric and corresponding probabilities of occurrence, the requirements on calculation are relaxed. A fast calculation of the total probability of occurrence of a predetermined value of the performance metric may be obtained.

In embodiments of the disclosed technology, creating a finite set of circuit or device parameter points includes defining, for each circuit or device parameter, a lower bound and an upper bound of parameter values for which the response values of the performance metric are to be determined, as well as a distribution of parameter values between the lower bound and the upper bound. The circuit or device parameter points of the finite set are thus not randomly selected within the n-dimensional parameter space or along a 1-dimensional axis of that parameter space, the one-dimensional axis representing one parameter value, for example the threshold voltage $V_{TH}$ of a single transistor.

In embodiments of the disclosed technology, the parameter values for a particular parameter may be equidistantly distributed between the lower bound and the upper bound for that parameter.

In embodiments of the disclosed technology, determining a response value and a probability of occurrence for each circuit or device parameter point, may include storing these response values and probabilities of occurrence.

The method may include grouping the response values based on value, so that response values that do not deviate more than a pre-determined error margin are grouped in a same bin. The bins may be ranked from high to low or vice versa. In embodiments of the disclosed technology, determining the total probability of occurrence of a predetermined value of the performance metric includes selecting one of the bins, and for the selected bin, summing all probabilities of occurrence. The summing may be implemented as an integration operation.

In alternative embodiments, the method may include comparing response values. Determining the total probability of occurrence of a predetermined value of the performance metric may include comparing each response value with the predetermined response value, and for all response values lower than the predetermined response value, summing the probabilities of occurrence. The summing may be implemented as an integration operation.

In a method according to embodiments of the disclosed technology, where the probabilities of occurrence of the circuit or device parameter points are time-dependent, the method may include repeating the steps of determining the probability of occurrence of the circuit or device parameter points; and determining, for a predetermined value of the performance metric, the total probability of occurrence. Doing this repeatedly can simulate the electronic system over time, possibly taking into account the workload.

In particular embodiments, the probabilities of occurrence of the circuit or device parameter points may be a function of at least one signal of the electronic circuit. According to embodiments of the disclosed technology, the time-dependency of the probabilities of occurrence can be taken into account when obtaining a probability of occurrence for a value of a performance metric of the electronic circuit. Hereto, the at least one signal may be represented by a series of distinct periodic activities, each having a period, a duty cycle, a duration, and environmental conditions like a power supply and temperature condition. The method according to embodiments of the present invention then may include performing signal compression on the at least one signal. The compressed signal may be used in simulation of the signal. Due to the compression of the signal, less calculating power is required, and faster calculations may be done.

In embodiments of the present invention, performing signal compression on the at least one signal may include temporally distinguishing regions of similar period and duty cycle. Performing signal compression on the at least one signal may be tunable based on similarity margins between discrete signal regions. Depending on the similarity margins set, the at least one signal may be divided into a higher or a lower number of series of distinct periodic activities. If the similarity margins are set stricter, deviation between subsequent portions in the signal will lead to determination of more distinguishable series of periodic activities. Relaxing the requirements on the similarity margins will allow more subsequent portions in the signal to be grouped together into one series of periodic activity.

In a second aspect, the disclosed technology provides a computer program product enabling a processor to carry out a method as described in embodiments of the first aspect of the disclosed technology, when executed on a computing device associated with a circuit simulator for simulating an electronic circuit. The computing device may include one of a microprocessor and an FPGA.

One embodiment is a method for obtaining a probability of occurrence for a value of a performance metric of an electronic circuit, implemented as a computer program that runs on a computer processing system. The computer program may be part of a computer software product (i.e. a carrier medium) that includes one or more code segments that cause a processor of the computer processing system, such as a circuit simulator, such as a CPU of the processing system, to carry out the steps of the method. The program runs under an operating system, and may include a user interface that enables a user to interact with the program. The simulation program operates on input data such as electronic device parameters and optionally time-dependent parameters relating to workload and environmental conditions such as temperature and supply voltage, and generates therefrom the probability of occurrence for a value of a performance metric of the electronic circuit. The probability of occurrence for the value of the performance metric of the electronic circuit may be used to decide how the electronic circuit will behave, optionally over time, and whether a corresponding design and/or driving of the electronic circuit is acceptable or not.

Further, embodiments of the disclosed technology include a non-transitory computer-readable medium storing instructions that when executed cause a processor to perform a method of simulating an electronic circuit. The medium may, for example, be a data carrier such as a CD-ROM, a memory key or a diskette which stores the computer program product in a machine readable form and which executes at least one of the method embodiments according to the first aspect of the disclosed technology when executed on a computing device. Nowadays, such software is often offered on the Internet or a company Intranet for download, hence the disclosed technology also includes transmitting the simulation computer product according to embodiments of the disclosed technology over a local or wide area network. The computing device may include one of a microprocessor and an FPGA.

In a third aspect, the disclosed technology provides a method for performing signal compression on a signal represented by a series of distinct periodic activities, each having a period, a duty cycle, a duration, and optionally a corresponding supply voltage and a temperature condition. Performing signal compression on the signal includes temporally distinguishing regions of similar period and duty cycle. In embodiments of the disclosed technology, performing signal compression on the signal may be tunable based on similarity margins between discrete signal regions. Depending on the similarity margins set, the at least one signal may be divided into a higher or a lower number of series of distinct periodic activities. If the similarity margins are set stricter, deviation between subsequent portions in the signal will lead to determination of more distinguishable series of periodic activities. Relaxing the requirements on the similarity margins will allow more subsequent portions in the signal to be grouped together into one series of periodic activity.

Certain aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described hereinabove. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIGS. 7A and 7B illustrate that calculation of Qbar (FIG. 7A) and Q (FIG. 7B) by sweeping voltage V uses the same function $f(V, V_{TH,PH}, V_{TH,PD}, V_{TH,AC})$, which is dependent on the threshold voltage of the PU, PD and AC transistors of the left respectively right side of the cell.

FIG. 8 illustrates hold SNM distribution for time-zero VTH random variability at decreasing supply voltage VDD. The lines illustrate that the numerical propagation technique can easily reach deep into the tails. The markers in the middle are added results of Monte Carlo simulation for comparison, which shows excellent agreement, except for the tails.

Figure 1:
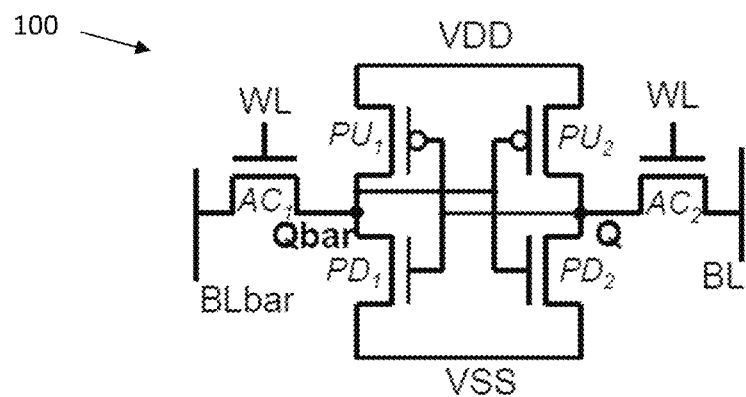
FIG. 1 illustrates a 6T-SRAM cell used for simulation.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

The disclosed technology will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the disclosed technology can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the disclosed technology. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

An electronic circuit in the context of the disclosed technology relates to a circuit assembled of individual electronic devices such as transistors, diodes, resistors, capacitors, inductors. These electronic devices are connected to one another by means of conductive paths. Electronic devices include semiconductor devices.

Various kinds of electronic devices and device technologies may be investigated by means of embodiments of the disclosed technology. Whilst of particular application to p- and n-channel FETs (MOSFETs), any other kind of electronic device for which the characteristics are influenced by capture and emission events covering both fabrication time or during operation, may be considered. Every effect in such a device that can be modelled by capture and emission events can be simulated by the disclosed technology. This includes bipolar junction transistors (BJTs), junction field effect transistors (JFETs), high electron mobility transistors (HEMTs), insulated-gate bipolar transistors (IGBTs) and so on. The disclosed technology is, however, not restricted to transistors as devices; for example various kinds of diodes known in the art may also be considered. Embodiments of the disclosed technology may be applied to any device were there are effects that degrade the devices in a partly statistical partly deterministic manner, depending on the workload Embodiments of the disclosed technology relate to workload-dependent reliability simulations of complex circuits and systems. In the context of the disclosed technology, "simulation" means a transient simulation over a given time period. During such simulation, the parameters of the technology are fixed for the active and passive elements that are used in the electronic circuit to be simulated. Hence a given parameter file is used with a predetermined set for all components (NMOS slow, PMOStyp, Rmin, Ctyp, etc.). The environmental conditions, e.g., temperature and supply voltage, determine the workload, and may be fixed for the entire simulation. Therefore, one process implementation may be simulated in a set of particular environmental conditions, such as at one predetermined temperature condition, and at a particular power supply. Nevertheless, such simulations can be repeated for different process parameters and/or for different environmental conditions, e.g., temperatures or power supply values, to get a more complete overview of the simulation results. For instance, one could wish to see the effect of a spike/dip on the supply or ground line, and can introduce this in the simulation by taking another $V_{dd}$ value. Furthermore, environmental conditions, e.g., temperature and/or supply voltage, may vary across the overall simulation time. Only within a single CDW segment, in accordance with particular embodiments of the disclosed technology, the environmental conditions are kept constant.

A first aspect is a method for simulating an electronic circuit. The method includes creating a finite set of circuit or device parameter points selected from within an n-dimensional parameter space. The set of circuit or device parameter points is a subset, i.e. less than all points of the total amount of possible circuit or device parameter points within that parameter space. The method further includes, for each circuit or device parameter point of the set, determining a corresponding response value of the performance metric and a corresponding probability of occurrence, and determining, for a predetermined value of the performance metric, the total probability of occurrence.

Due to their minimum device dimensions thus subject to variability, SRAM cells are excellent for a high sigma evaluation case study. Therefore, embodiments will be explained and elucidated by referring to SRAM cells and circuits as particular examples of electronic circuits. This, however, is not intended to be limiting for the disclosed technology, which can be applied to any type of electronic circuit. The disclosed methods and devices are particularly useful for simulation of large electronic circuits, for instance electronic circuits including at least thousands of gates, for instance tens of thousands, hundreds of thousands, or millions of gates.

Furthermore, features and advantages are explained with reference to BTI as one particular example of a time-varying phenomenon that is critical to reliability. This, however, is not intended to be limiting for the disclosed technology. The methods and devices according to embodiments of the disclosed technology apply also to other workload-dependent reliability simulations of complex circuits and systems.

FIG. 1 depicts a 6T-SRAM cell 100 used, as an example only, for simulation. Such cell is currently the most commonly used 6-T SRAM structure for embedded memory. For the sake of description, both commercial 28 nm planar and research-grade FinFET 14 nm and 10 nm nodes will be evaluated. The exemplary illustrated SRAM cell 100 includes four core transistors: two PMOS Pull UP transistors PU1, PU2 and two NMOS Pull Down transistors PD1, PD2. Access NMOS transistors AC1, AC2 are used to read and write the value Q, Qbar stored by the core transistors PU1, PU2, PD1, PD2 using the Word Lines WL and the Bit Lines BL, BLbar. Access and core transistors are assumed to share their bulk connections which are tied to the supply rails VDD and VSS. Exemplary transistor and SRAM sizing parameters for the SRAM cell 100 under study are given in TABLE 1, which lists transistor and SRAM parameters used for planar and bulk FinFET technology.

TABLE 1

|  | BULK | FinFET | |
| --- | --- | --- | --- |
| Tech node [nm] | 28 | 14 | 10 |
| $A_{VT}$ [mV µm] | 2 | 1.3 | 1 |
| $\sigma_{0,PU}$ [mV] | 35 | 22 | 19 |
| $\sigma_{0,PD}$ [mV] | 30 | 16 | 14 |

TABLE 1-continued

|  | BULK | FinFET | |
|---|---|---|---|
| Tech node [nm] | 28 | 14 | 10 |
| $\sigma_{0,AC}$ [mV] | 35 | 22 | 19 |
| sizing ratio | 2-2-3 | 1-1-2 | 1-1-2 |
| $V_{DD}$ [V] | 1 | 0.8 | 0.7 |
| $V_{TH0}$ [V] | 0.6 | 0.25 | 0.25 |
| $T_{INV}$ [nm] | 1.5 | 1.3 | 1.2 |
| $V_{OV}/T_{INV}$ [MV/cm] | 2.7 | 4.2 | 3.7 |
| $A_n$ [V] | 3.5e-2 | 3.1e-2 | 3.1e-2 |
| $A_p$ [V] | 1.9e-2 | 2.0e-2 | 2.0e-2 |
| $\gamma_n$ | 4.8 | 5.2 | 5.2 |
| $\gamma_p$ | 2.5 | 3 | 3 |
| $n_n$ | 0.203 | 0.158 | 0.158 |
| $n_p$ | 0.186 | 0.173 | 0.173 |

BTI $\Delta V_{TH}$ is simulated using distribution (1) with the powerlaw components (Y, η) and prefactors A. The mean shift $\langle \Delta V_{TH} \rangle$ follows a power-law dependency $$\mu_{\Delta V_{TH}}(t) = \langle \Delta V_{TH}(T) \rangle = A V_{OV}^{\gamma} t^n \quad (4)$$

where t is the total DC stress time and $V_{OV}$ is the overdrive voltage calculated as $$V_{OV} = V_G - V_{TH} = V_{DD} - V_{TH} \quad (5)$$

Correlation between the time-zero and time-dependent variances have been observed experimentally and can be used to estimate the average impact per defect η by first calculating the time dependent variance as $$\sigma^2_{\Delta V_{TH}}(t) = \frac{\langle \Delta V_{th}(t) \rangle}{100 \text{ mV}} \sigma^2_{V_{TH0}} \quad (6)$$

Figure 2:
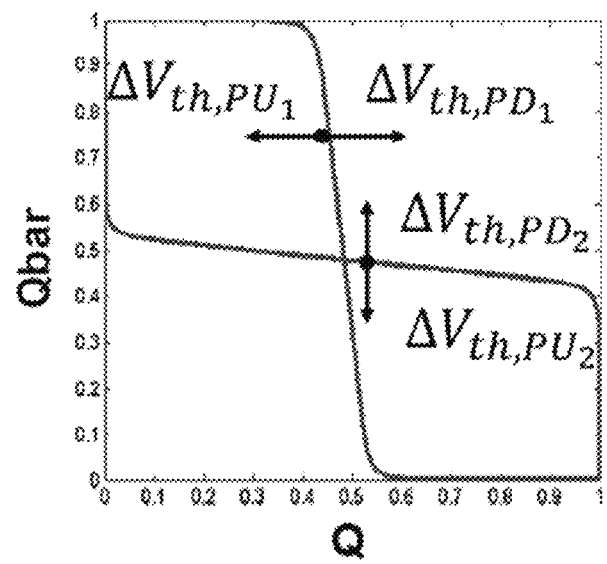
FIG. 2 illustrates a butterfly curve for the cell illustrated in FIG. 1. From analysis of this curve during hold mode, where the word lines are set at 0V and the bitlines at VDD, a performance metric, as an example SNM margins, may be obtained.

To quantify the impact of BTI stress, static margins may be used to determine a performance metric. In the example illustrated, not intended to be limiting for the disclosed technology, the performance metric is the static noise margin (SNM), which may be calculated from a butterfly curve analysis as illustrated in FIG. 2, and as described by Seevinck E. et al. in "Static-noise margin analysis of MOS SRAM cells", Solid-State Circuits, IEEE Journal of Solid State Circuits, vol. 22, no. 5, pp. 748-754, October 1987, incorporated herein by reference. SNM may be estimated graphically as the length of a side of the largest square that can be embedded inside the lobes of the butterfly curve. For determining the SNM, in the example illustrated, the internal nodes Q and Qbar of the SRAM cell 100 as illustrated in FIG. 1 are independently swept from 0 to VDD, and their complementary nodes Qbar and Q, respectively, are monitored. Here the SNM is defined as the minimum of the two largest squares, each fitting inside a lobe of the butterfly curve. The shape of the butterfly curve is highly dependent on the $V_{TH}$ of all SRAM transistors. SNM may be estimated during read and hold cases.

Taking this into account, the SNM becomes a 6-dimensional non-analytical function. Numerical representation of the response surface (FIG. 3) may be determined by a simulator, such as a SPICE (simulation program with integrated circuit emphasis) level simulator, and may be used to calculate the SNM response surface.

In embodiments of the disclosed technology, other performance metrics could for instance be, the disclosed technology not being limited thereto, write margin, circuit delay, dynamic and/or leakage power.

Figure 3:
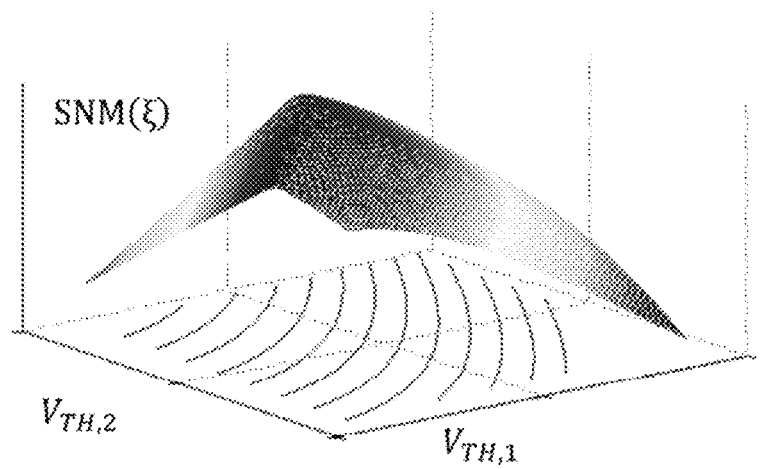
FIG. 3 illustrates a 2-dimensional slice of the performance metric response surface, e.g., SNM response surface, where $V_{TH,1}$ and $V_{TH,2}$ are parameters of the total parameter space $\xi \rightarrow (V_{TH,1}, V_{TH,2})$.
Figure 4:
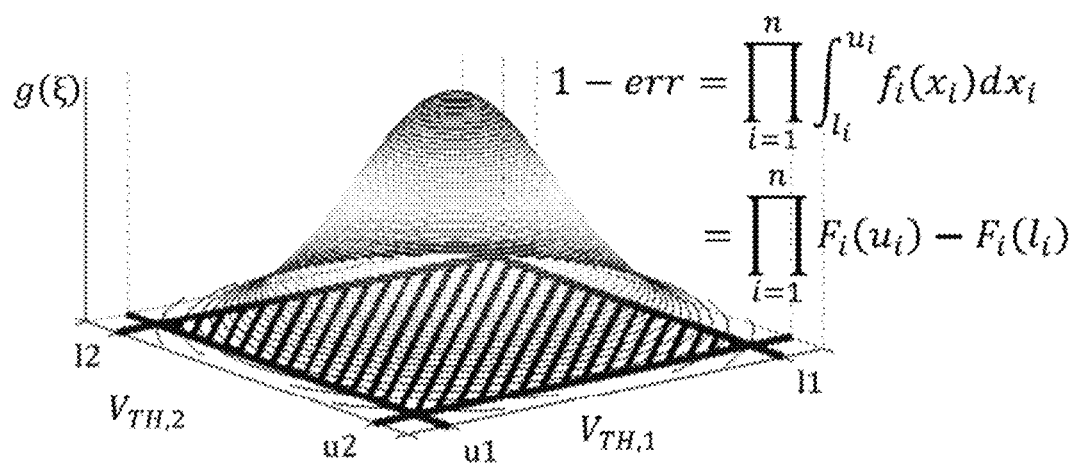
FIG. 4 illustrates the probability density function $g(\xi)$ Since the response surface cannot be constructed for all possible circuit or device parameter values, an error is introduced into the final CDF calculation. This error can be reduced to acceptable levels by choosing the lower (l) and upper (u) bounds of the circuit or device parameters to be evaluated.

In embodiments of the disclosed technology, the response surface may be used for calculation of output statistics. FIG. 3 illustrates the response surface for the particular example of performance metric SNM(ξ) as function of finite set (hence a limited number of) circuit or device parameter points of the parameter space ξ. The parameter space ξ is n-dimensional, the number of dimensions depending on the number of circuit or device parameters taken into account for the simulation. FIG. 3 represents only a 2-dimensional slice of the SNM response surface, where $V_{TH,1}$ and $V_{TH,2}$ are parameters of the total parameter space ξ. The corresponding SNM Probability density function (PDF) can be evaluated by propagating the PDF g(ξ) of the circuit or device parameters via the output response surface SNM(ξ) (FIG. 4). The SNM probability density f(x) can be evaluated by integrating g(ξ) over all n parameters of the n-dimensional parameter space (hence most likely over more than only $V_{TH,1}$ and $V_{TH,2}$ illustrated in FIG. 3 and FIG. 4) for SNM(ξ)=x:

$$f(x) = \int_x g(\xi) d\xi \quad (7)$$

By integration of the PDF, one can obtain the cumulative distribution function (CDF) of the performance metric SNM:

$$F(x) = \int_{-\infty}^{X} \int_X g(\xi) d\xi dx \quad (8)$$

Solving this problem has no analytical approach, however, since the response surface has no closed form solution and is evaluated using a simulator like for instance SPICE simulation. Simulation of the response surface in a finite amount of time requires truncating the response surface. This introduces an error on the final SNM CDF and has to be considered. The error depends on the range taken for the circuit or device parameter domain, hence on the lower bound and upper bound of parameter values taken into account. This error, as illustrated in FIG. 4 is, for independent circuit or device parameters is given by $$err = 1 - \prod_{i=1}^{n} \int_{l_i}^{u_i} f_i(x) dx \quad (9)$$

This error can be reduced to very low levels by suitable selection of lower bounds and upper bounds of the plurality of parameter values, and by suitable distribution of the selected parameter values between the lower and upper bounds, making it possible to reach deep into tails.

In alternative embodiments of the disclosed technology, rather than using the response surface for calculating the output statistics as explained above, a mathematically equivalent calculation method may be used. One embodiment thereof is by making use of line integrals. However, calculating line integrals for a large enough set of SNM values can be computationally quite intensive. In accordance with embodiments of the disclosed technology, a numerical method may be used to calculate the CDF using a similar methodology but circumventing the cumbersome line integrals.

Figure 5A:
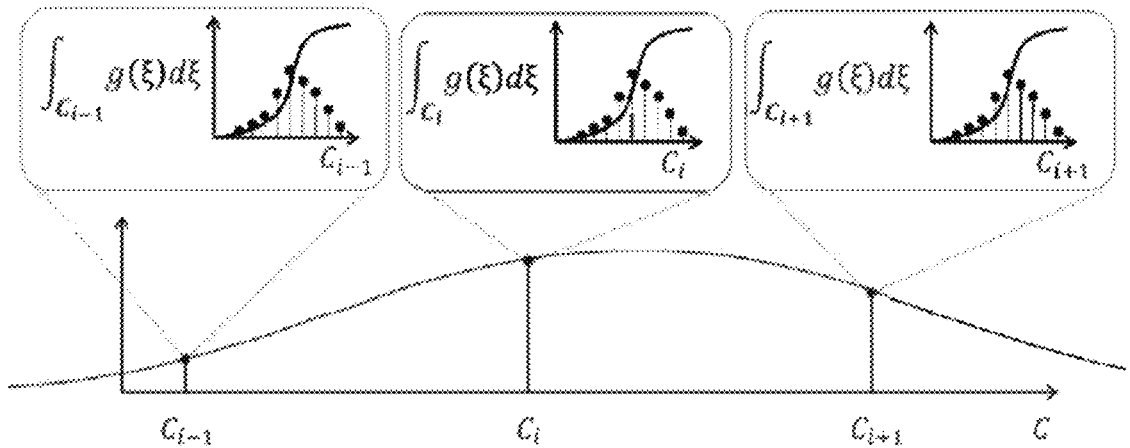
FIGS. 5A and 5B illustrate a schematic representation of the numerical calculation of the PDF value for each contour line $C_i$. The PDF $f(C_i)$ can be constructed by sorting all values according to C. The final CDF $F(C_m)$ can be numerically calculated by a cumulative sum of $g_i(\xi)$ sorted according to C.
Figure 5B:
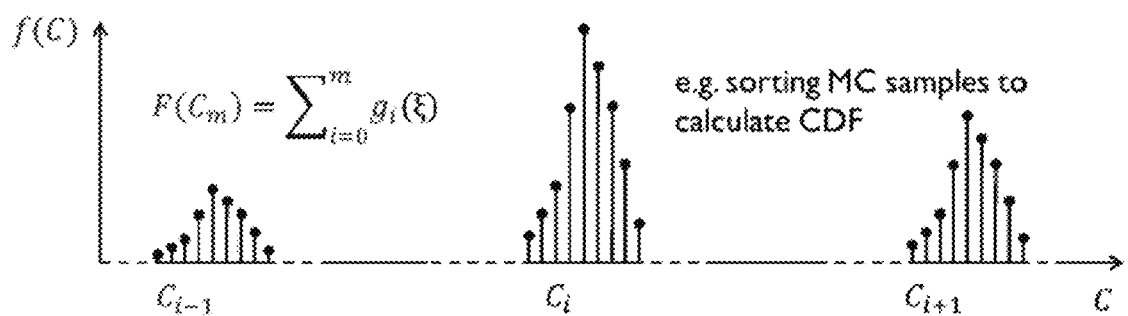

Shown in FIGS. 5A and 5B are SNM PDF points calculated using equation (7) and placed on the SNM axes, i.e.

they are sorted according to the SNM value. The PDF points $f(C_i)$ can be unwrapped to their original contributions being the PDF points $g(\xi)$ for all values of circuit or device parameter points $\xi$ where $SNM(\xi)=C_i$. For an equidistant discrete parameter space (e.g., response surface lookup table), equation (8) can be rewritten as $$F(C_m) = \sum_{i=0}^{m} g(\xi_i) \quad (10)$$

which is a mathematically equivalent calculation performed by sorting all circuit or device parameters PDF points $g(\xi_i)$ by their corresponding output value $C_i$ (FIGS. 5A and 5B). For a non-equidistant discrete input space, proper bookkeeping is needed where weights $w_i$ need to be attributed to $g(\xi_i)$ to calculate the SNM CDF by the sum $$F(C_m) = \sum_{i=0}^{m} w_i g(\xi_i) \quad (11)$$

The weights $w_i$ are proportional to the n-dimensional volume of the circuit or device parameter points $\xi_i$. The methodology can thus make advantage of optimal meshing schemes for the parameter space, e.g., adaptive meshing.

The above embodiment is explained for the case where all circuit or device parameters PDF points $g(\xi_i)$ are sorted by their corresponding output value $C_i$. Hereto, the response values $C_i$ may be grouped based on value so that response values that do not deviate more than a per-determined error margin from one another are grouped in a same bin. The bins may then be ranked, for instance from high to low or vice versa. Determining the total probability of occurrence of a predetermined value of the performance metric may then include selecting one of the bins, and for the selected bin, summing all probabilities of occurrence.

In alternative embodiments, rather than sorting the circuit or device parameters PDF points $g(\xi_i)$ by their corresponding output value $C_i$, the output values $C_i$ may each be simply taken and compared to a reference value. In this case, equation (8) can be rewritten as $$F(SNM) = \Sigma_{i=0}^{m} g(\xi_i) \text{ for } Ci < SNM \quad (12)$$

Determining the total probability of occurrence of a predetermined value of the performance metric in this case may include comparing each response value with the predetermined response value, and for all response values lower than the predetermined response value, summing the probabilities of occurrence.

Figures 6A, 6B:
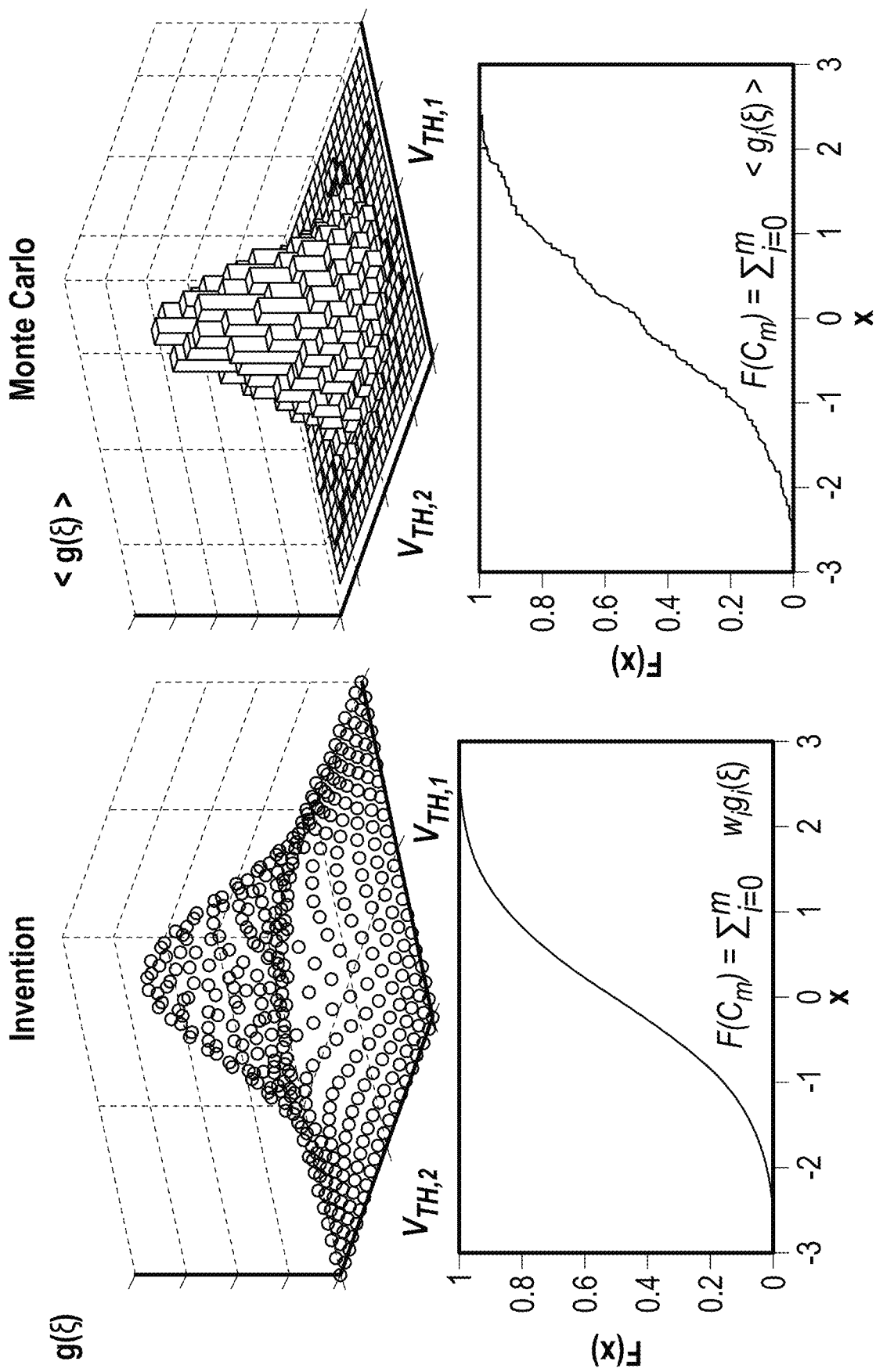
FIGS. 6A and 6B illustrate the method according to embodiments of the disclosed technology (FIG. 6A) with Monte Carlo methodology (FIG. 6B). The method according to embodiments of the disclosed technology creates a finite set of circuit or device parameter points with known probability density $g(\xi)$ and computes the output parameter, e.g., performance metric, density by using a numerical integration. Monte Carlo randomly generates samples according to the circuit or device parameter distribution density and provides an estimate for the output parameter density, e.g., performance metric density; given by the number of samples inside a given output interval.

FIGS. 6A and 6B compare the methodology according to embodiments of the disclosed technology with the standard MC methodology where various similarities can be observed. Both methodologies are numerical integration techniques for calculating the output CDF. Monte Carlo randomly generates samples according to the circuit or device parameter distribution density and provides an estimate for the output parameter density, e.g., performance metric density, given by the number of samples inside a given output interval.

A method according to embodiments of the disclosed technology (illustrated in FIG. 6A) creates a finite set of circuit or device parameter points with known probability density $g(\xi)$ and computes the output parameter density, e.g., performance metric density, by using a numerical (e.g., Riemann-Stieltjes) integration. Compared to Monte Carlo (illustrated in FIG. 6B) and extensive MC approaches (e.g., importance sampling, quasi MC), the method according to embodiments of the disclosed technology allows for extensive control over the accuracy of the output distribution by controlling the circuit or device parameter points. The methodology according to embodiments of the disclosed technology can provide for a uniform accuracy of the output distribution across a wide sigma range, compared to MC where the accuracy decreases exponentially when moving towards higher sigmas.

Experiments

Using the methodology in accordance with embodiments of the disclosed technology, as described hereinabove, the SRAM structure 100 has been simulated with the parameters as given in TABLE 1. When simulating Hold SNM it is sufficient to create the response surface as a function of the threshold voltages of the four core transistors PU1, PU2, PD1, PD2, since in this mode of operation the access transistors AC1, AC2 are off and will have no impact on the butterfly curves. Contrary, for Read SNM calculation, where the Word Lines WL are high, the access transistors AC1, AC2 are on and do impact the butterfly curves. Here the response surface has to be calculated as a function of the threshold voltages of all six transistors PU1, PU2, PD1, PD2, AC1, AC2. Furthermore, margins to assess the writeable of the cell like for instance Write Trip Point (WTP) analysis also requires calculating the response surface as function of all six transistor's threshold voltage.

Reducing the dimensionality of the problem using sensitivity analysis is desirable, since the number of simulation points (i.e. the finite set of circuit or device parameter points) to create the response surface increases rapidly for higher dimensions. Specifically for SRAM analysis a significant reduction can be achieved by exploiting the symmetry of the cell as illustrated in FIGS. 7A and 7B. For a symmetric SRAM cell the SNM response surface can be written as $$SNM = h(V_{TH,PU1}, V_{TH,PD1}, V_{TH,AC1}, V_{TH,PU2}, V_{TH,PD2}, V_{TH,AC2}) \quad (13)$$
$$= h^*(f(V_{TH,PU1}, V_{TH,PD1}, V_{TH,AC1}),$$
$$f(V_{TH,PU2}, V_{TH,PD2}, V_{TH,AC2}))$$

This allows simulation of one side of the SRAM cell instead of two for function $f(V, V_{TH,PU}, V_{TH,PD}, V_{TH,AC})$ and reconstruction of the response surface using equation (13). This reduces the 6-dimensional problem of the experiment to a 3-dimensional problem.

Shown in FIG. 8 is the methodology according to embodiments of the disclosed technology applied to the calculation of the Hold SNM (i.e. Word Lines WL=0V) distribution with time-zero variability at decreasing supply voltage VDD. Excellent matching of MC samples is obtained at low quantiles but the accuracy goes up to the 7-8 sigma quantile by choosing a wide enough input range for creating the response surface according to equation (9). Due to the flexible set-up, various supply voltages can be simulated to acquire the minimum retention voltage under local variability.

Since the SNM is defined as the minimum of the two Seevinck squares that can be fit inside the butterfly curve, it will at some point collapse to zero. This will happen abruptly when the two voltage transfer curves stop overlapping. Consequently, the SNM response surface has a discontinuity at SNM=0 which will propagate to the SNM distribution.

Figure 9:
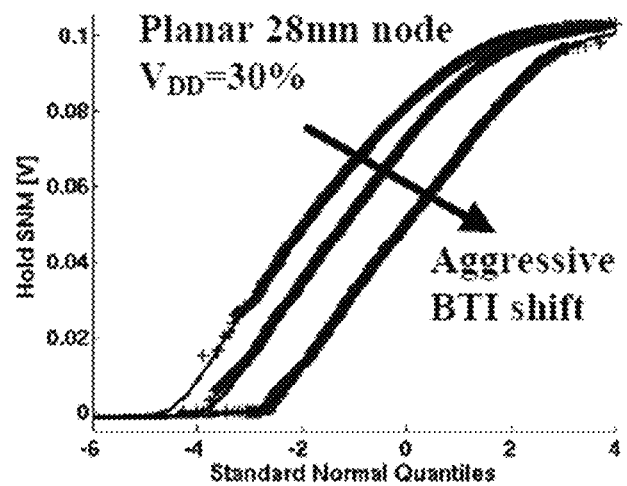
FIG. 9 illustrates that aggressive BTI shifts up to 80 mV are introduced in 28 nm planar node to show the excellent fitting of discontinuities when the SNM becomes 0.
Figure 10:
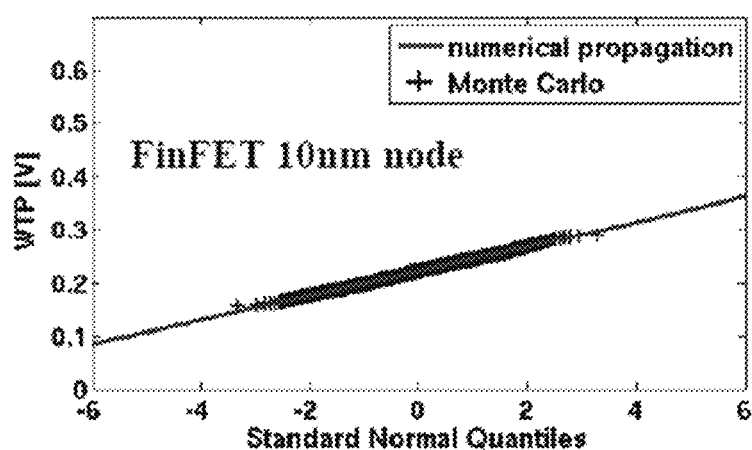
FIG. 10 illustrates write trip point (WTP) distribution for time-zero variability of a 10 nm FinFET SRAM cell. Numerical propagation technique is extendable to higher dimensions, e.g., 6-D in this case for WTP distributions.

However, discontinuities of the response surface are inherently handled which is crucial for numerous circuit output performance parameters. Shown in FIG. 9 is the simulation of the Hold SNM for a 28 nm planar SRAM, where aggressive BTI shifts up to 80 mV are introduced to show the excellent fitting of discontinuities when the SNM becomes 0. It is thus clear that, with a method in accordance with embodiments of the disclosed technology, this discontinuity can be accurately handled. The methodology according to embodiments of the disclosed technology can also be applied to higher input dimensions, e.g., the case of Write Trip Point (WTP) analysis as shown in FIG. 10, where the access transistors need to be taken into account.

Figure 11:
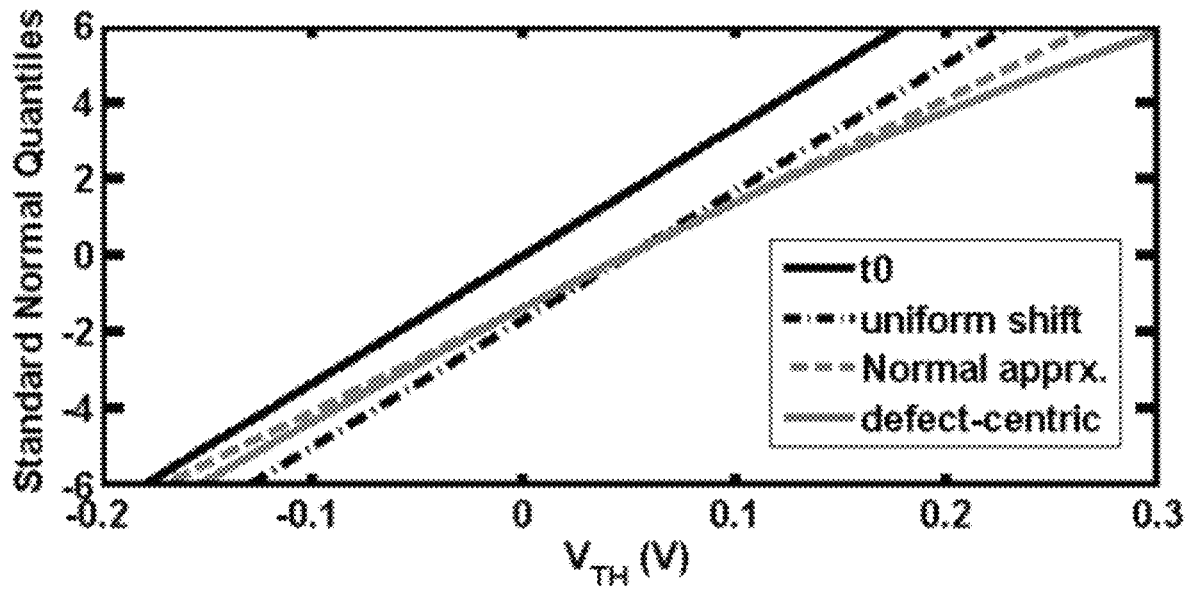
FIG. 11 illustrates that the total $V_{TH}$ distribution can be approximated by i) only shifting the time-0 distribution by the degradation amount $\Delta V_{TH}$ or by ii) shifting and adjusting the spread. The discrepancy iii) between the defect-centric distribution and the approximations is evident at higher quantiles.
Figure 12:
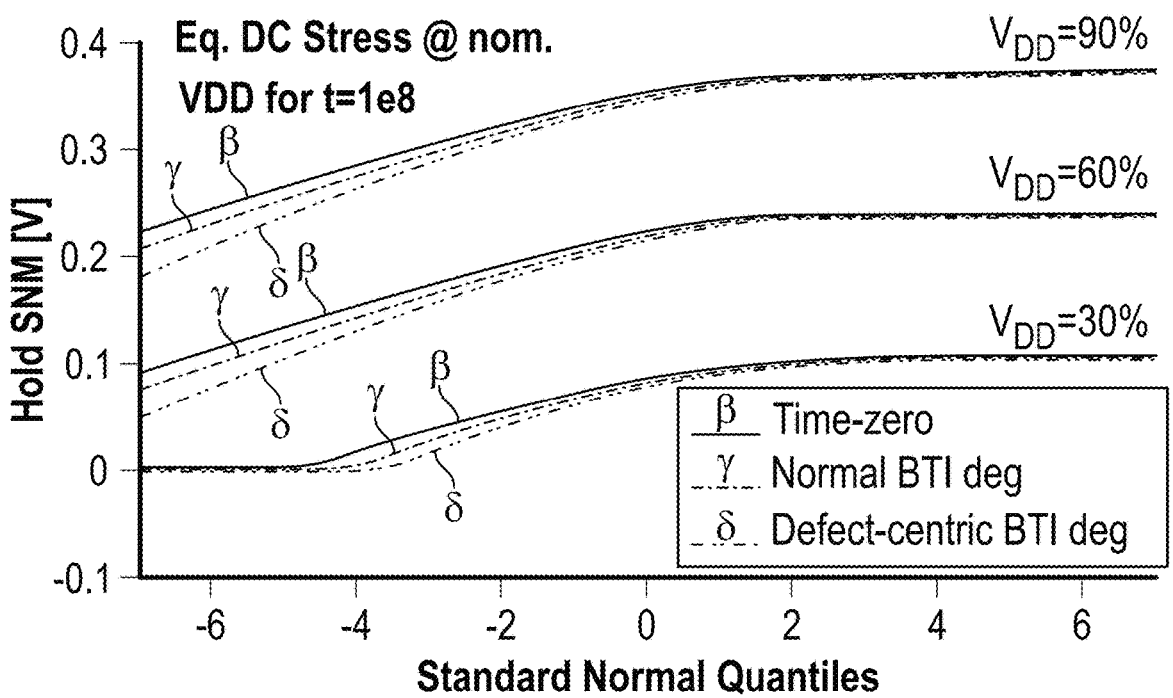
FIG. 12 illustrates hold SNM degradation for 28 nm planar SRAM simulated for time-zero variation and for BTI degradation using a Normal and defect-centric distribution.
Figure 14:
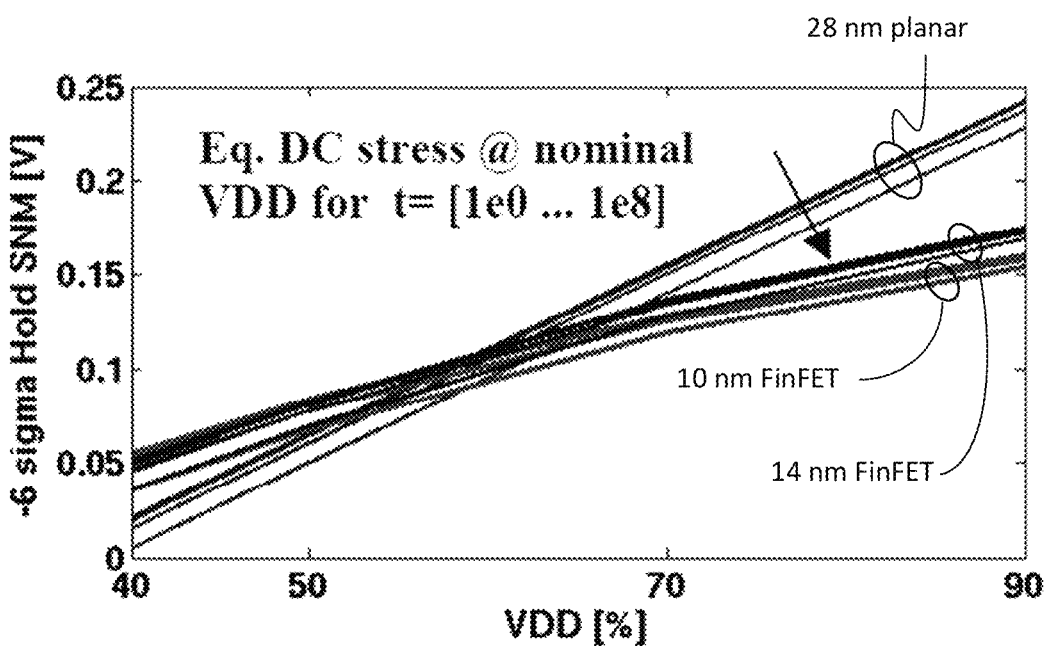
FIG. 14 illustrates hold SNM degradation at the $-6$ standard normal quantile taken at various $V_{DD}$ reduction points.

FIG. 11 illustrates that the total $V_{TH}$ distribution can be approximated by (i) only shifting the time-zero distribution by the degradation amount $\Delta V_{TH}$ or by (ii) shifting and adjusting the spread. The discrepancy between the defect-centric distribution and the approximation is evident at higher quantiles. As thus shown in FIG. 11 the defect-centric BTI distribution deviates from a normal distribution for high sigmas. To verify the importance of correctly simulating the tail of the BTI distribution, as can be done in accordance with embodiments of the disclosed technology, Hold SNM is simulated for a 28 nm planar SRAM cell using an approximating Normal distribution as illustrated in FIG. 12. Using a Normal distribution for the BTI degradation can cause significant error compared to the defect-centric case and will moreover increase further for higher quantiles. Upon reducing the supply voltage, higher sensitivity for this discrepancy is observed at lower VDD as shown in FIG. 14 which can severely underestimate the minimum supply voltage for data retention. Planar technologies show a higher discrepancy compared to FinFET due to the higher intrinsic variability. FinFET technologies on the other hand show higher sensitivity of the discrepancy as function of supply voltage.

Figure 13:
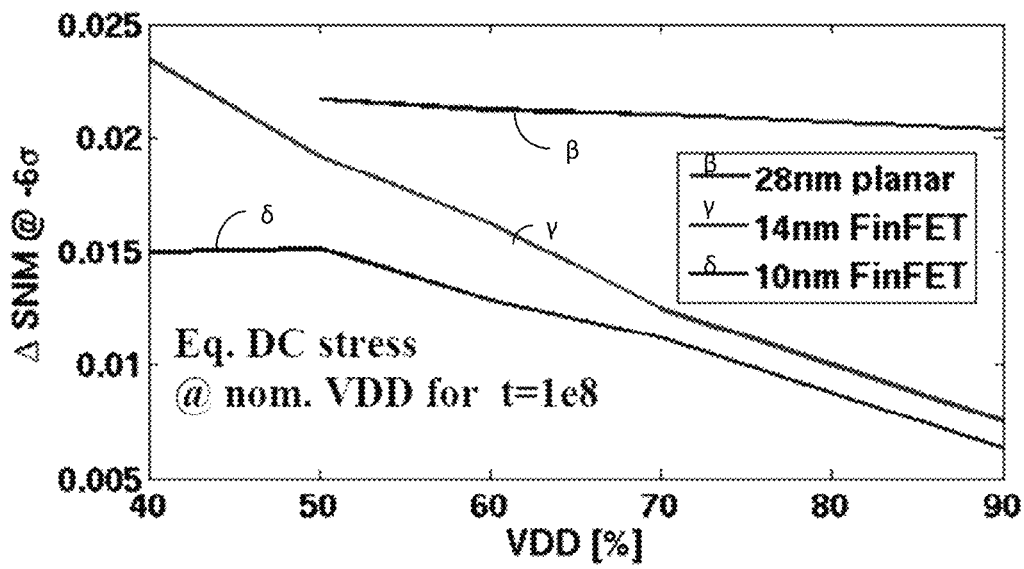
FIG. 13 illustrates the difference between Normal and defect-centric BTI at $-6\sigma$ for planar and FinFET technologies.

Using the method according to embodiments of the disclosed technology, fast sensitivity analysis for worst case −6 quantile can be performed for supply voltage lowering and as a function of stress time using equation (4), as shown in FIG. 13. Here FinFET technology proves to have a higher robustness for SRAM cell hold stability at lower voltages. BTI degradation results in an increased data retention voltage needed to maintain a pre-determined SNM margin.

In accordance with further embodiments of the disclosed technology, the probabilities of occurrence of the circuit or device parameter points are time dependent. Simulating a probability of occurrence of a value of a performance metric of an electronic circuit, for instance such simulations as described in more detail above, can be applied for a sequence of time instances in a potentially very long time period, such as e.g., over a time period as long as a few minutes to a few hours. The time period over which the simulations can be carried out can be at least $10^8$ clock cycles, for instance $10^{12}$ clock cycles or more. The method then includes repeating the steps of determining the probability of occurrence of the circuit or device parameter points, and determining, for a predetermined value of the performance metric, the total probability of occurrence.

Each simulation, i.e. each evaluation of the response value of the performance metric is dependent on the active workload (value of input signals) applied to the electronic circuit at that time instance. Each workload signal can be represented by a waveform over time, as for instance illustrated in FIG. 15. The computational complexity of a simulation model is tightly coupled to the granularity of the signal activity representation for each simulated device of the electronic circuit. Moreover, given the variability of supply voltage and temperature across modern integrated circuits (ICs), also full temperature and bias dependency of the BTI effect are desirable in the simulation.

In accordance with embodiments of the disclosed technology, a waveform representation called compact digital waveform (CDW) can be used. Being of tunable accuracy, this format exploits optimally the accuracy versus complexity tradeoff. It can be used for fast BTI simulations.

For ease of explanation, a transient waveform is assumed, which in the most detailed case is represented as a SPICE signal. Up to now, SPICE has been considered as the industry standard for IC simulation, in which in a transient simulation mode, signals are adaptively discretized across time. It can be assumed that a SPICE signal is the most accurate signal representation.

In embodiments of the disclosed technology, it is proposed to group consecutive signal regions that feature a similar frequency f and duty cycle $\alpha$ figures and that occupy a duration $\Delta t$, at particular environmental conditions such as supply voltage $V_{DD}$ and temperature T. Each region of the signal that adheres to this property is represented by a single CDW point with coordinates (f,$\alpha$,$\Delta t$). To derive these points, the initial signal is scanned, which for the sake of simplicity is represented by a Value Change Dump (VCD) equivalent. Such VCD representation creates an abstraction of voltage signals to logic levels.

It will be assumed that the VCD format includes only the high (Vdd) and low (Vss) levels; however, the VCD standard does support multiple Vdd representations, and thus, the input can be perceived as a succession of low and high voltage levels, e.g., a sequence of AC pulses that have, in the general case, varying f and $\alpha$ values. As the digital signal is scanned, a buffer accumulates pulses that satisfy Equation (14):

$$|f_{pulse} - f_{buffer}| < \varepsilon_f \wedge |\alpha_{pulse} - \alpha_{buffer}| < \varepsilon_\alpha \quad (14)$$

When a digital pulse is come across that cannot be appended (i.e., does not satisfy Equation (14)), the buffer is flushed to a single CDW point and re-initialized to receive the next pulses. $E_f$ (Hz) and $\varepsilon_\alpha$ (p.u.) are user-defined error margins. These margins enable the tunable accuracy of the CDW approximation. The crudest approximation is achieved with $\varepsilon_f \rightarrow +\infty$ and $\varepsilon_\alpha \rightarrow 1$, since all digital pulses are then appended to the buffer. Conversely, for the finest approximation is set $\varepsilon_f \rightarrow 0$ and $\varepsilon_\alpha \rightarrow 0$. With this configuration, each individual AC pulse constitutes a single CDW point, in the worst case. Using the CDW format, any signal may be represented by a series of periodic activities, each having a period, a duty cycle and a duration over which the activity is periodically repeated. A method according to embodiments of the disclosed technology may include such grouping of a series of distinct periodic activities with similar period and duty cycle by temporally distinguishing such regions.

The values $f_{buffer}$ and $\alpha_{buffer}$ are defined in Equation (15) for a buffer containing n pulses and are computed every time a new digital AC pulse is appended to the buffer $$f_{buffer} = \frac{1}{n} \sum_{i \in buffer} f_i \wedge \alpha_{buffer} = \frac{1}{n} \sum_{i \in buffer} \alpha_i. \quad (15)$$

Figure 17:
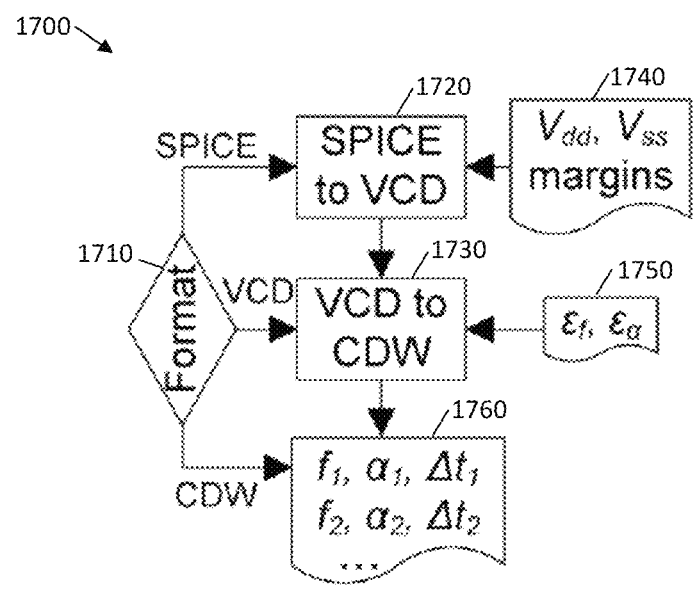
FIG. 17 is a flow chart of a tool for producing CDW representations given SPICE and VCD waveforms, in accordance with embodiments of the disclosed technology.

The concept of the waveform approximation according to embodiments of the disclosed technology, as explained above, has been implemented in a tool, which produces CDW representations given SPICE or VCD waveforms. The functionality of this tool can be seen in the flowchart of method 1700 in FIG. 17.

In decision block 1710, method 1700 identifies SPICE, VCD, and CDW formats. Method 1700 routes SPICE waveforms from block 1710 to block 1720, which converts SPICE waveforms to VCD waveforms, given $V_{dd}$ and $V_{ss}$ margins from block 1740. Method 1700 routes VCD waveforms from blocks 1710 and 1720 to block 1730, which converts VCD waveforms to CDW representations, given $\varepsilon_f$ and $\varepsilon_a$ from data block 1750. Data block 1760 illustrates CDW representations from decision block 1710 or block 1730.

Figure 15:
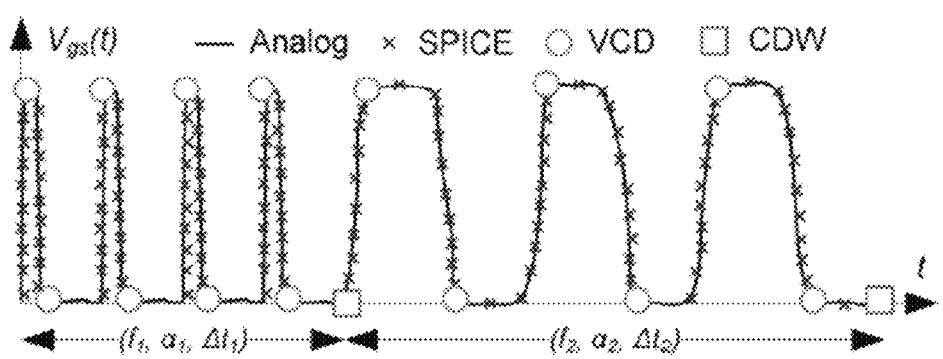
FIG. 15 illustrates CDW in accordance with embodiments of the disclosed technology in comparison to the respective SPICE and VCD waveforms: signal regions with similar frequency f and duty cycle α are grouped in a single CDW point.
Figure 18:
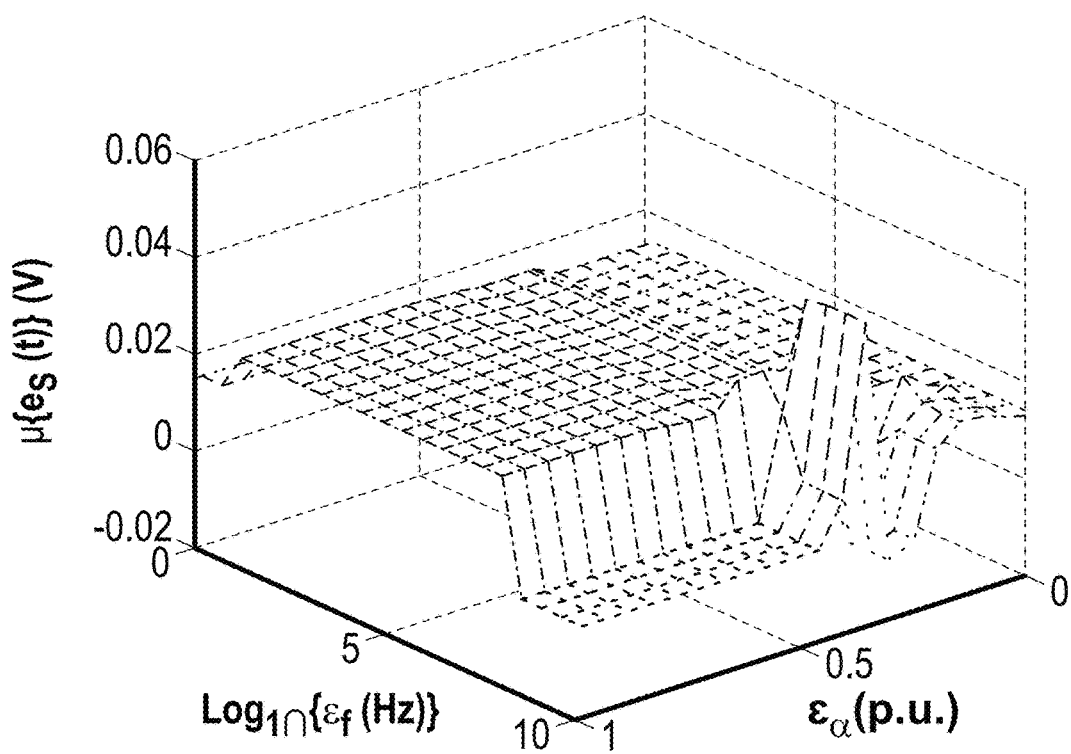
FIG. 18, FIG. 19 and FIG. 20 illustrate accuracy assessments of a tool for producing CDW representations given SPICE and VCD waveforms, in accordance with embodiments of the disclosed technology, whereby the tool produces CDW representations using a 1 μs bit stream.
Figure 19:
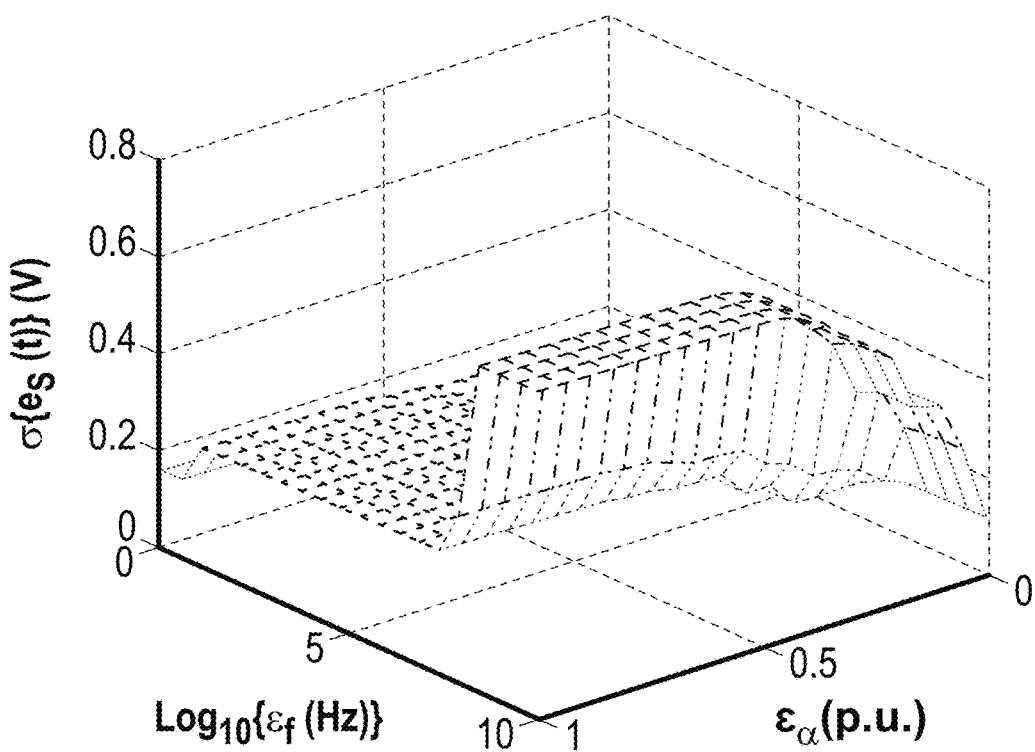

A qualitative example of the produced CDWs can be seen in FIG. 15. In order to assess the accuracy of the tool according to embodiments of the disclosed technology, a random 1 µs bit stream of 1 GHz frequency is used. The CDW representation is compared against the respective SPICE waveform. The error of signal approximation according to Equation (16) is defined $$e_s(T) = V_{SPICE}(t) - V_{CDW}(t) \qquad (16)$$

and the mean (FIG. 18) and standard deviation (FIG. 19) values are derived. Given that the buffer of the tool according to embodiments of the disclosed technology averages-out the f and a values of the grouped pulses, reduced impact of the tool on the mean error of the approximation is expected (FIG. 18). However, the standard deviation (FIG. 19) is affected much more, given that a cruder approximation misses both voltage transitions and regions of constant voltage level.

Figure 20:
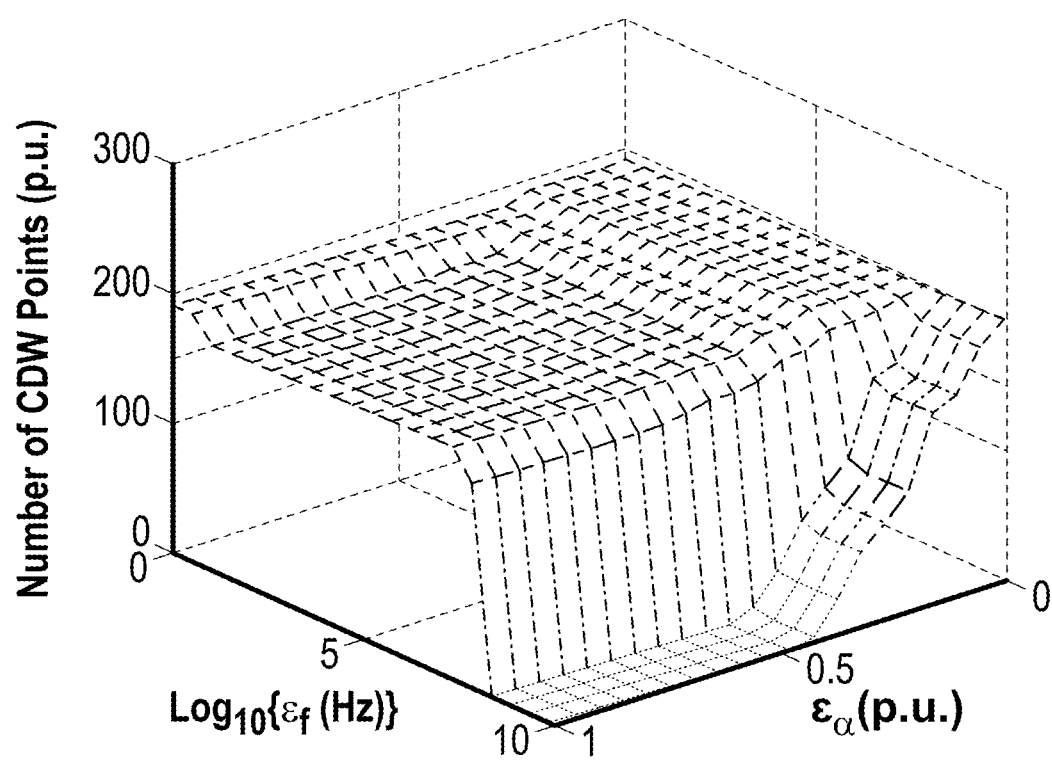

Apart from the accuracy of the CDW representation according to embodiments of the disclosed technology from a signal integrity point of view, it is relevant to consider the achieved compression in the number of points it uses for representation. FIG. 20 illustrates the number of points produced for various choices of the $\varepsilon_f$ and $\varepsilon_a$ error margins. The number of points used by any signal representation is directly coupled to the CPU time required for electronic circuit simulation, as in the case of atomistic or defect-centric BTI/RTN simulation. The reason is that each point corresponds to a single iteration of the respective simulation model. The aggressive reduction in the number of such points in accordance with embodiments of the disclosed technology is one further step towards a computationally feasible simulation. The reason for that is that (many) fewer individual time point simulations will need to be done in order to obtain the time-dependent probability of occurrence of a value of a performance metric of the electronic circuit. This is achieved over an extended lifetime of the target circuit, across which the CDW representation spans.

In the following, the impact is explored that aggressive CDW compression has on the accuracy of simulation modeling.

Given the compression capabilities of a CDW according to embodiments of the disclosed technology, it is important to explore its usability for the target goal, namely to execute the electronic circuit simulation, for instance atomistic BTI/RTN simulation, over strides of $V_{gs}$ workload. As an example, in accordance with embodiments of the disclosed technology, a version of the atomistic BTI model will be altered and reformulated as follows: Starting from the premise of first order kinetics, the capture probability of a gate stack defect follows the ODE of Equation (17). The general solution returns the capture probability ($P_c$), after n $V_{gs}$ pulses of specific frequency f and duty cycle a have been applied (equivalent duration $\Delta t = n/f$). The proposed model fully retains workload memory through the initial condition $P_{c0}$. Parameters a and b are functions of f and $\alpha$:

$$\frac{dP_c}{dt} = aP_c + b \Rightarrow P_c = \left(P_{c0} + \frac{b}{a}\right)e^{an} - \frac{b}{a}. \qquad (17)$$

Figure 16:
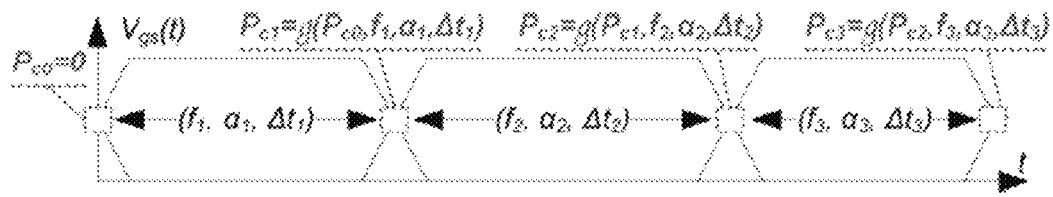
FIG. 16 illustrates a pseudo-transient simulation set-up according to embodiments of the disclosed technology.

The initial condition $P_{c0}$ is absent from the previous version of the AC BTI model. Hereinafter, $P_{c0} \neq 0$ will be assumed, thus introducing memory to the AC BTI model (i.e., workload dependency over time). Each iteration of the general solution of Equation (17) is used as initial condition for the next model evaluation. The tool implementing the compact digital waveform approximation, presented hereinabove, identifies regions of similar frequency f and duty cycle $\alpha$ in the $V_{gs}$ (i.e., a CDW representation is produced). Then, at each (f,$\alpha$,$\Delta$t) point, a single iteration of Equation (17) is evaluated, representing the impact of the entire duration of that CDW segment. The latter can potentially be very long, encompassing a huge amount of individual time points. In this way, the CDW representation according to embodiments of the disclosed technology reduces aggressively the number of model iterations required for the calculation of $P_c$. That way, time-dependent circuit simulation, for instance BTI simulation, becomes computationally feasible over long time spans (see FIG. 15). In FIG. 16 can be seen how the CDW format is combined with the proposed BTI/RTN atomistic model of Equation (17). Given the compression capabilities of the CDW representation (see FIG. 20), the number of model iterations is aggressively reduced, thus decreasing the CPU time required for simulation.

A method according to embodiments of the disclosed technology then only has to be applied to the CDW segments or primitives and not to the individual time instances. Or stated in other words: the number of simulations to be carried out can be reduced, thus improving (reducing) the time required to simulate the electronic circuit.

In what follows, as an example, BTI evaluation is performed using CDW in accordance with embodiments of the disclosed technology.

The accuracy, from a signal integrity point of view, of the concept of the waveform approximation according to embodiments of the disclosed technology, has been assessed hereinabove. Given the model of Equation (17), the accuracy of a CDW approximation in terms of evaluation of capture probability Pc will now be evaluated.

For experiments, 100 random bit streams with an average frequency ($f_{avg}$) of 1 GHz and a duration of 1 µs have been used. Given each signal, an error metric for BTI evaluation is defined, according to Equation (18):

$$e_p = P_{c,SPICE} - P_{c,CDW} \qquad (18)$$

where $P_{c,SPICE}$ is the capture probability for a defect at the end of the signal based on SPICE evaluation (e.g., using Equation (19)). $P_{c,CDW}$ is a similar capture probability, using a CDW file (for a specific pair of $\varepsilon f$ and $\varepsilon\alpha$) and the model of Equation (17).

$$P_c(t+t_s) = \frac{\tau_{ei}}{\tau_{ei} + \tau_{ci}} + \left[P_c(t) - \frac{\tau_{ei}}{\tau_{ei} + \tau_{ci}}\right]\exp\frac{-t_s(\tau_{ci} + \tau_{ei})}{\tau_{ci}\tau_{ei}} \qquad (19)$$

Equation (19) is the core of a transient workload dependent implementation of the atomistic BTI model as described for instance by B. Kaczer et al. in "Atomistic approach to variability of bias-temperature instability in circuit simulations", in Proc. IEEE IRPS, 2011, pp. XT.3.1-XT.3.5.

Figure 21A:
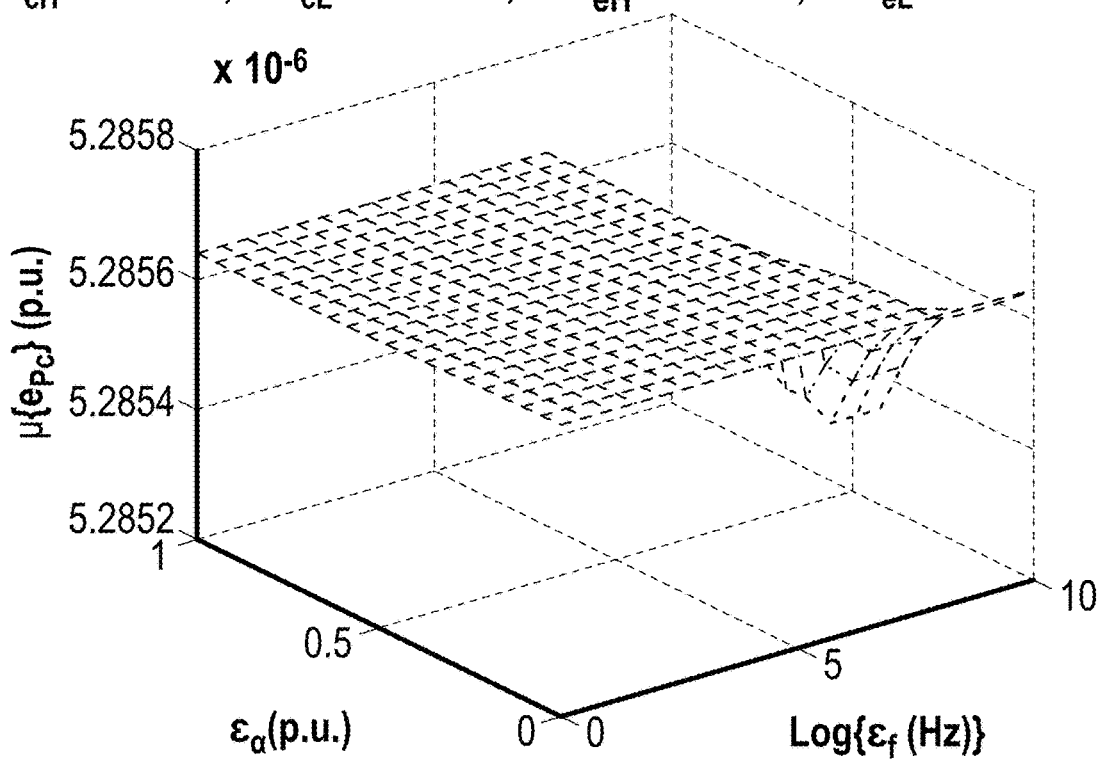
FIGS. 21A-21O illustrate accuracy assessment of the atomistic BTI model of Equation (17) for various degrees of CDW compression in accordance with embodiments of the disclosed technology.
Figure 21B:
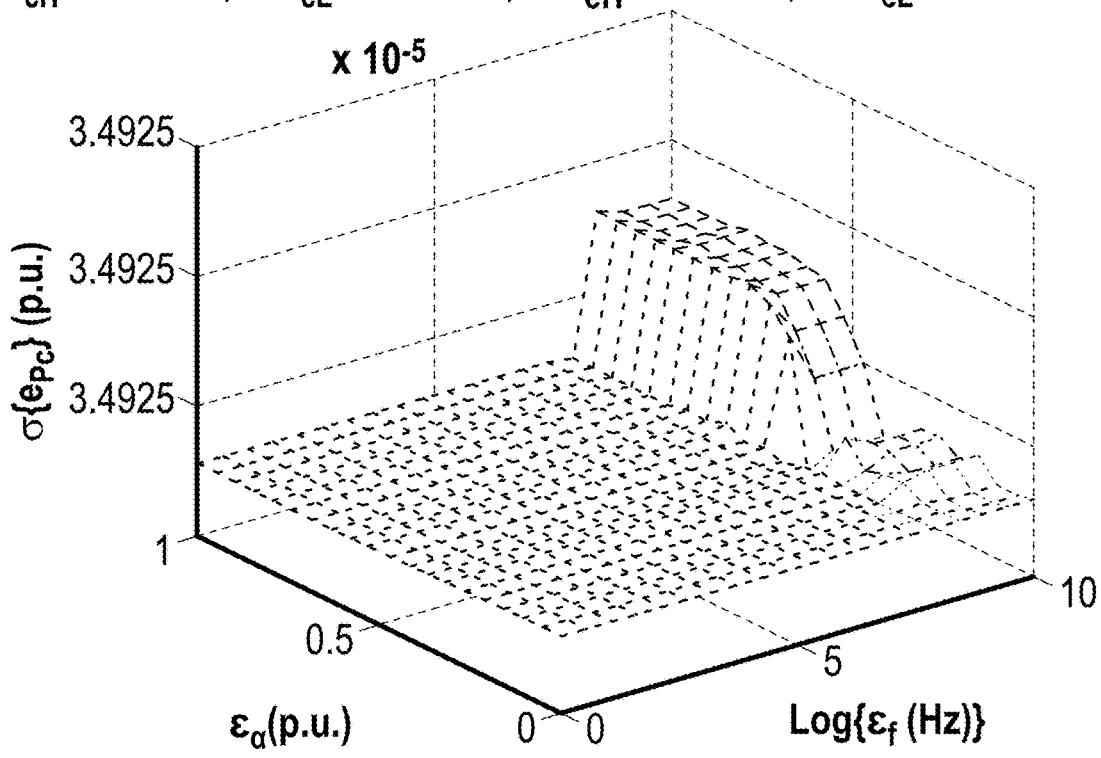
Figure 21C:
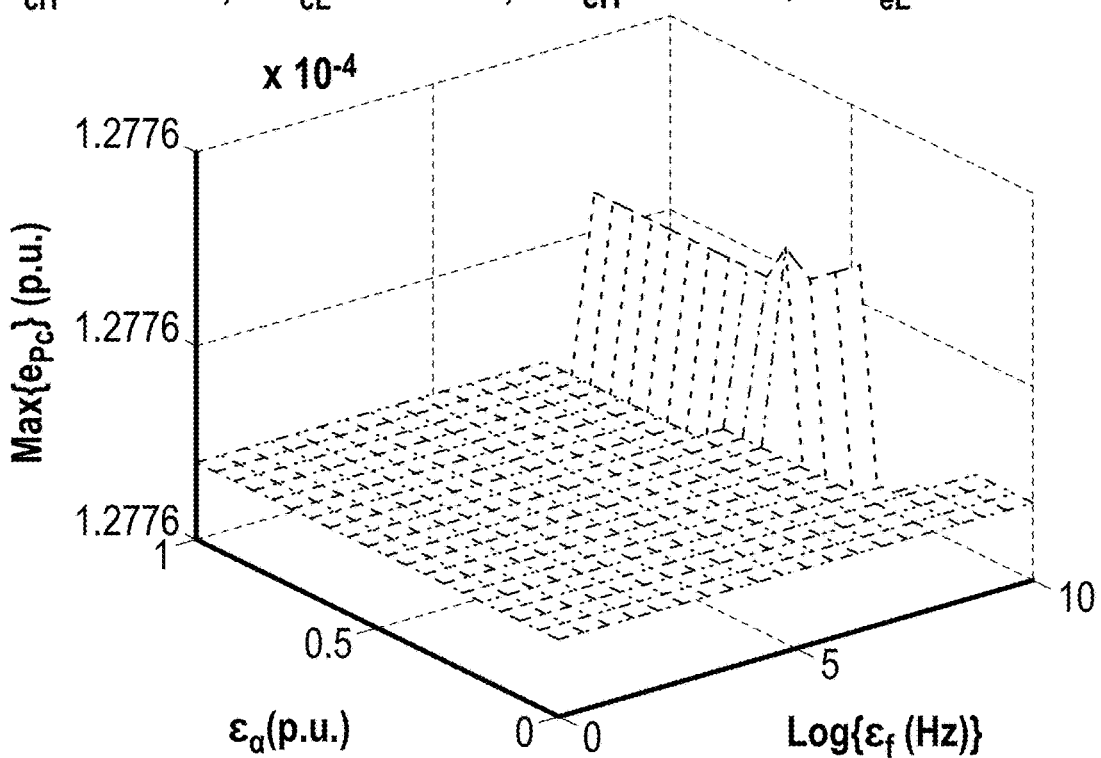
Figure 21D:
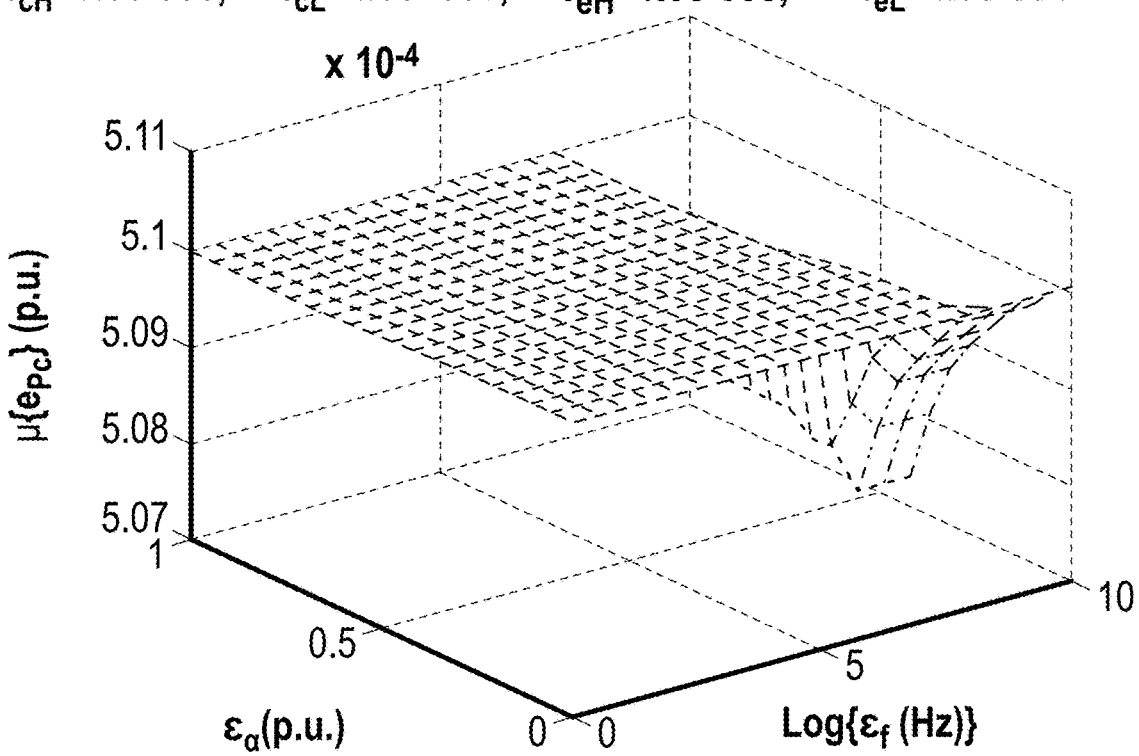
Figure 21E:
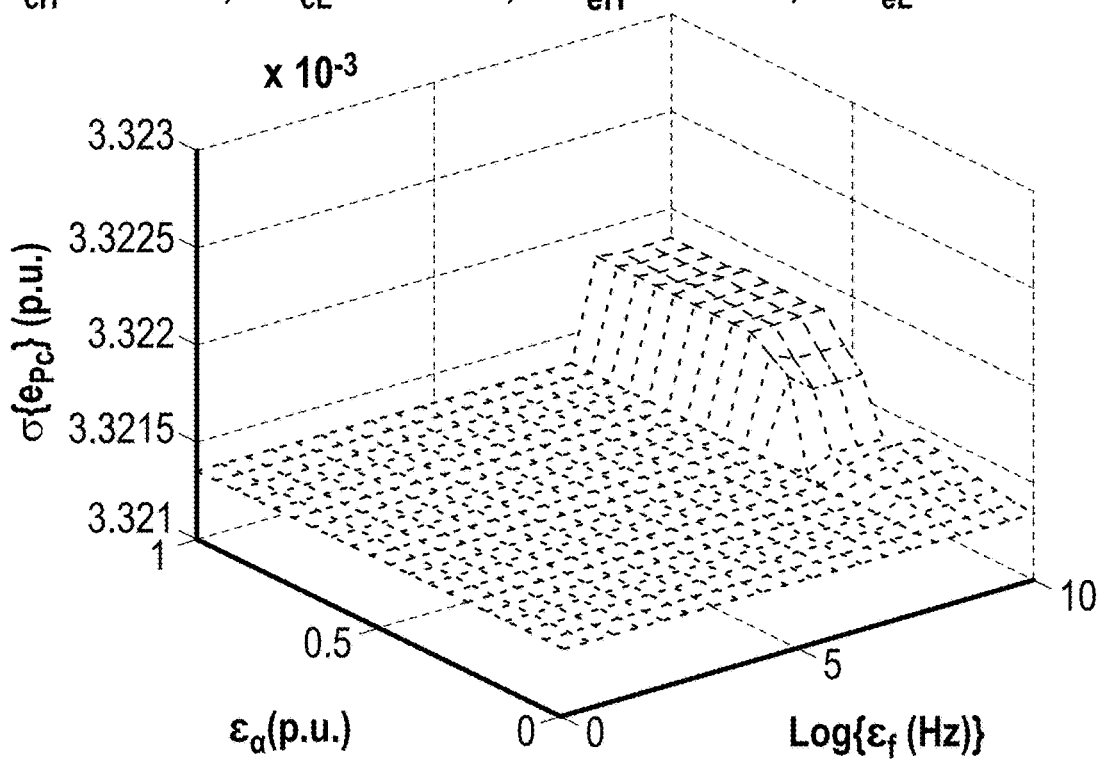
Figure 21F:
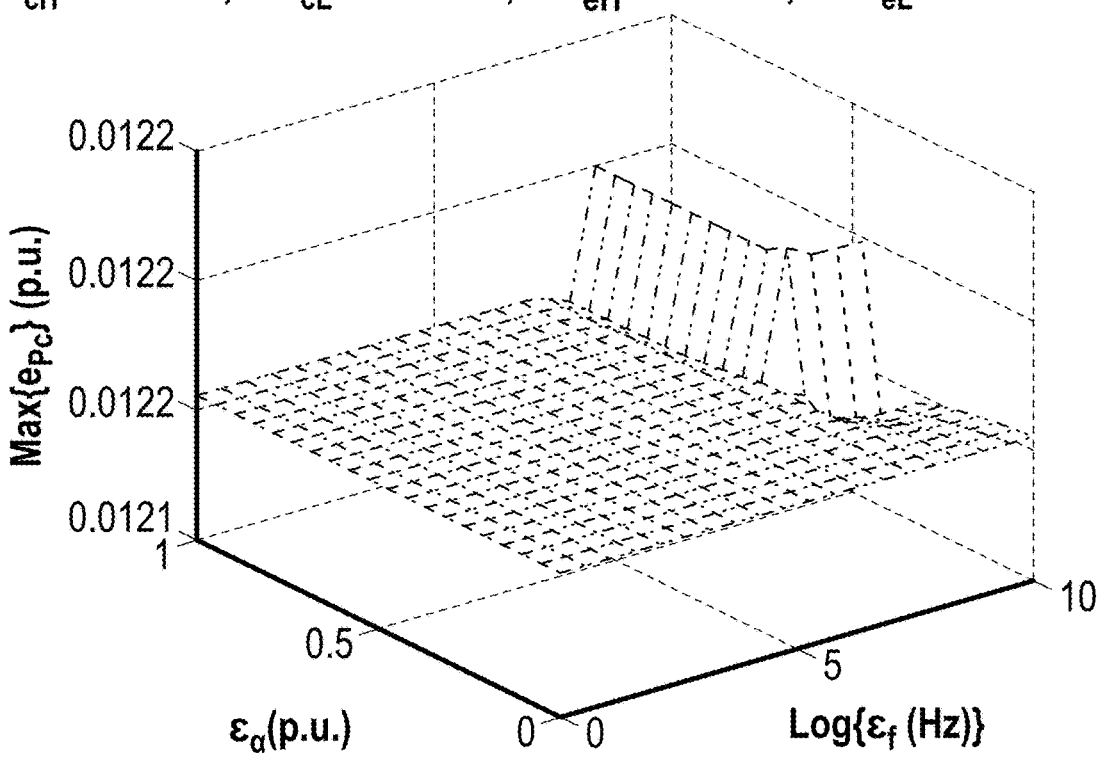
Figure 21G:
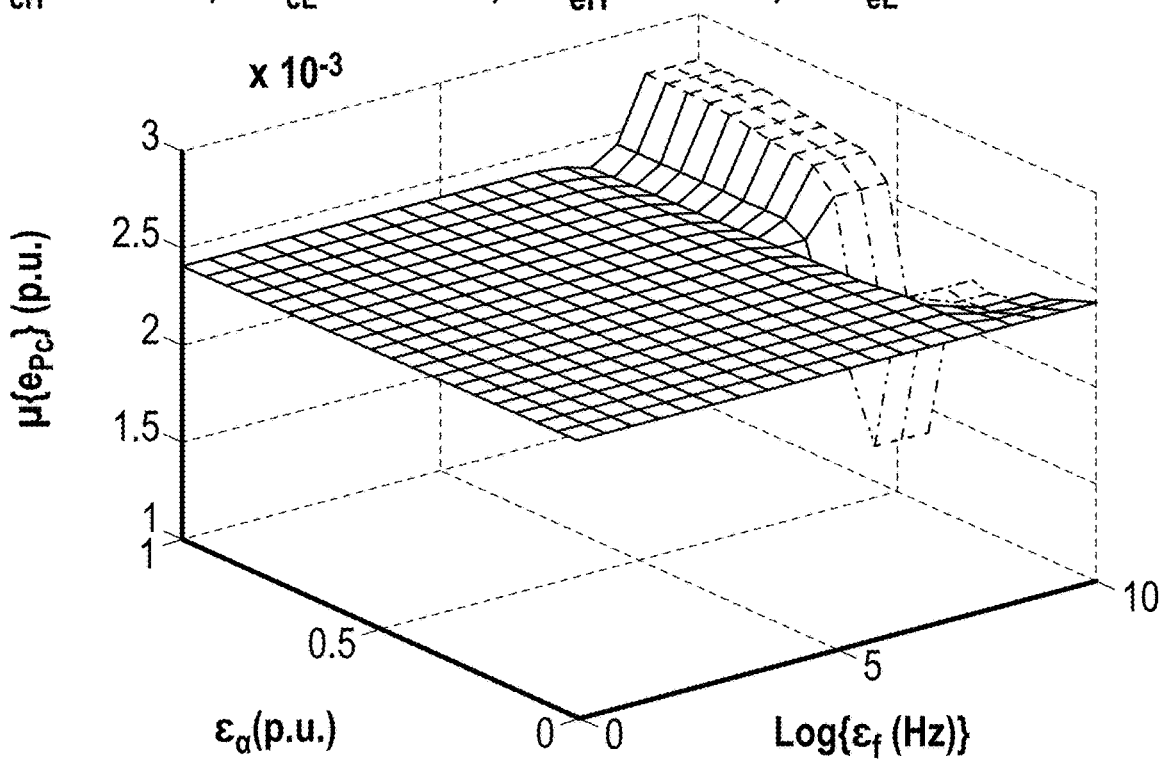
Figure 21H:
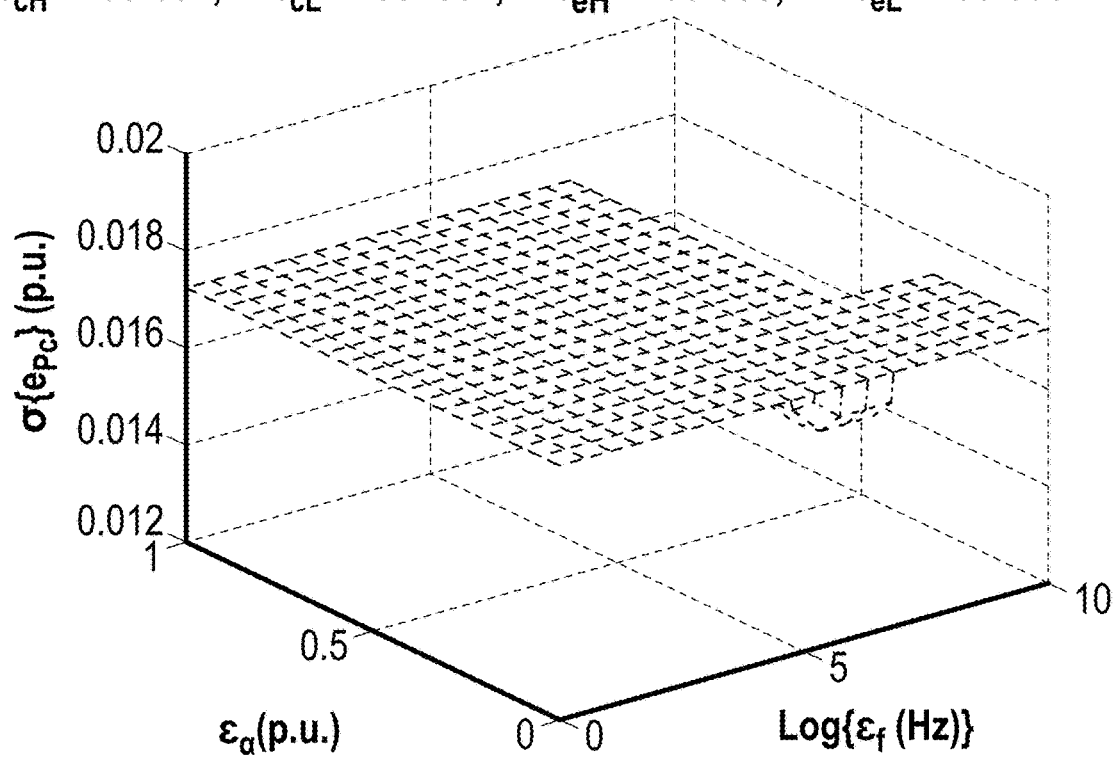
Figure 21I:
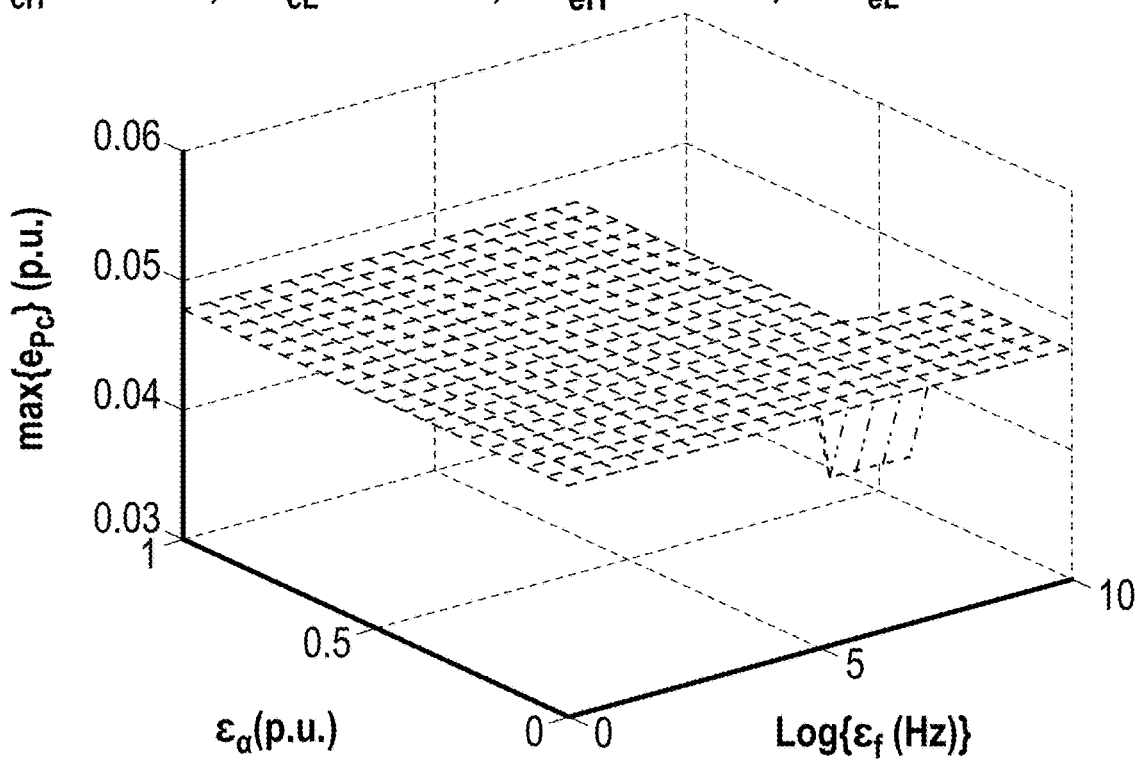
Figure 21J:
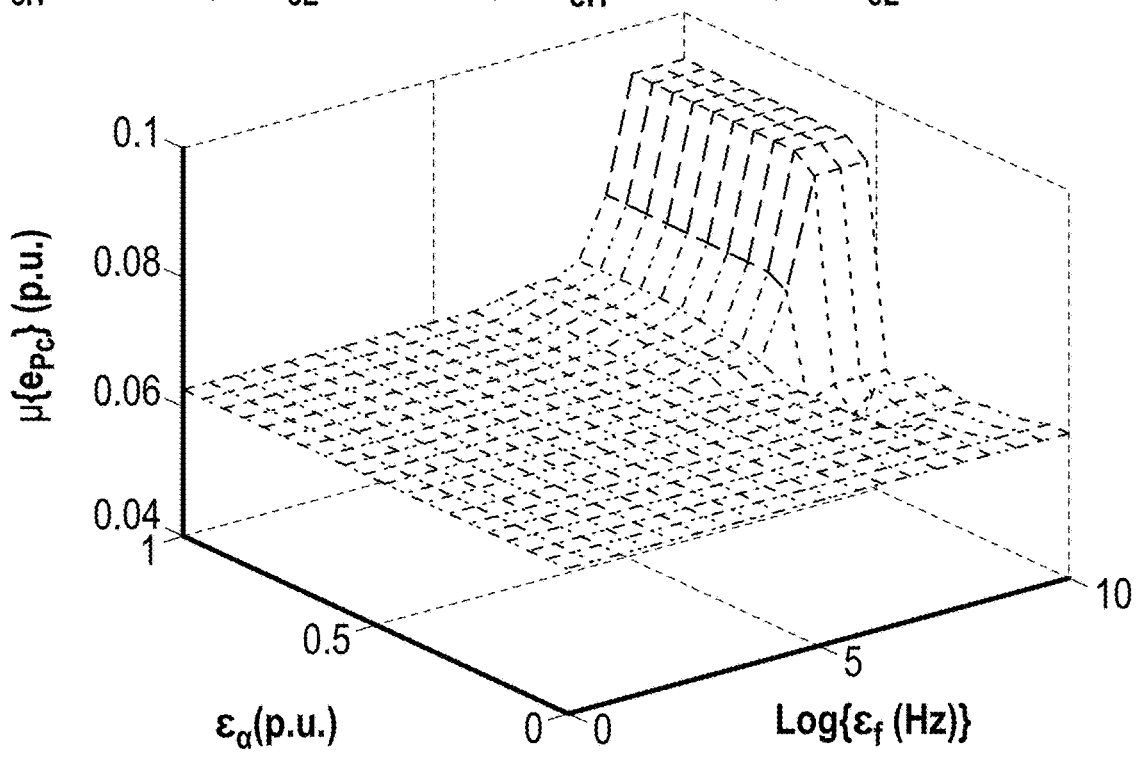
Figure 21K:
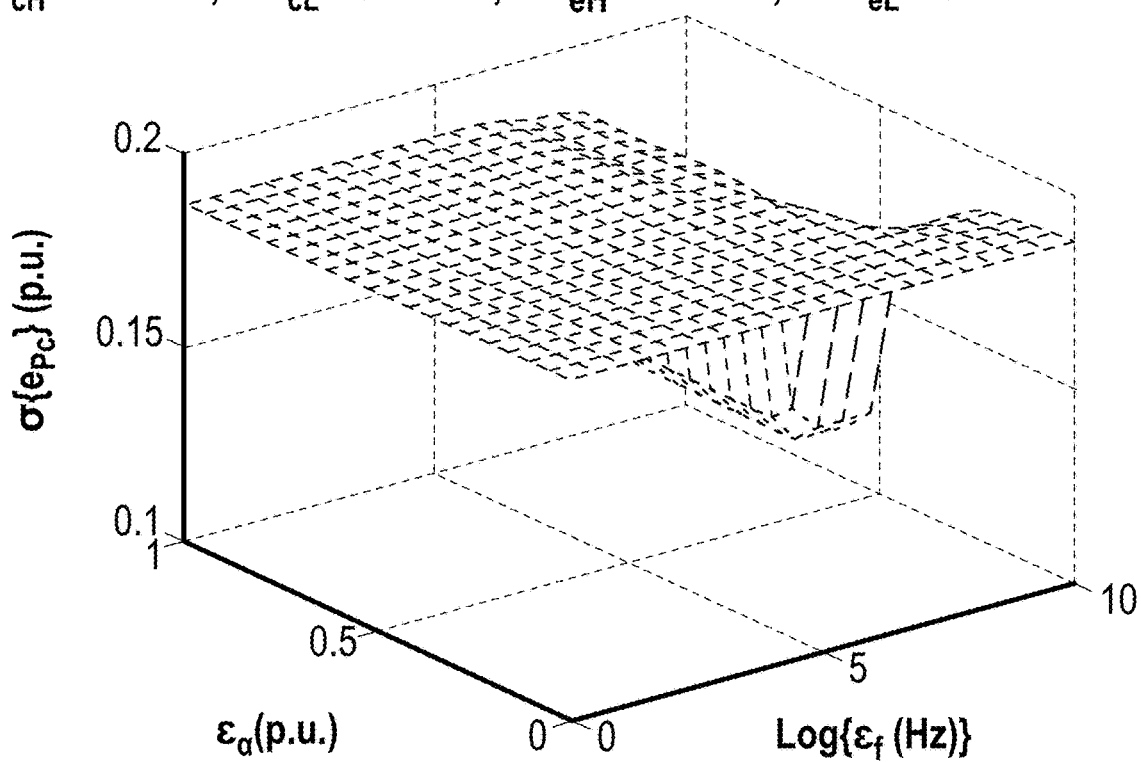
Figure 21L:
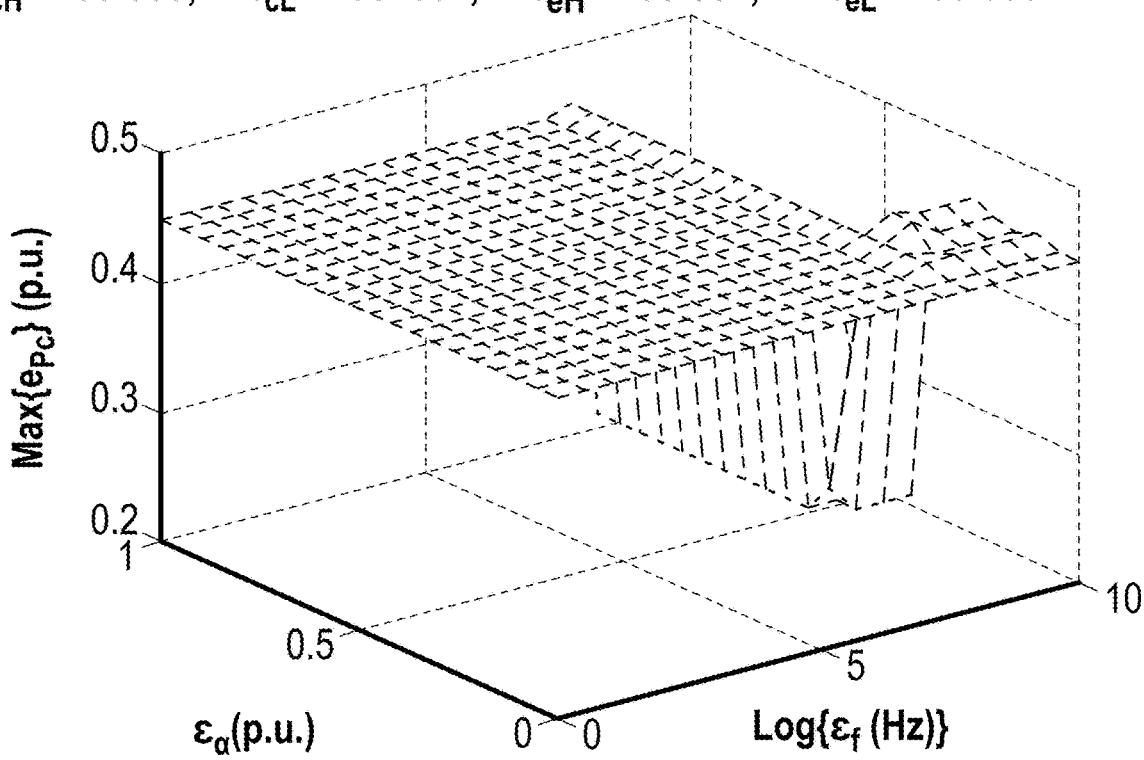
Figure 21M:
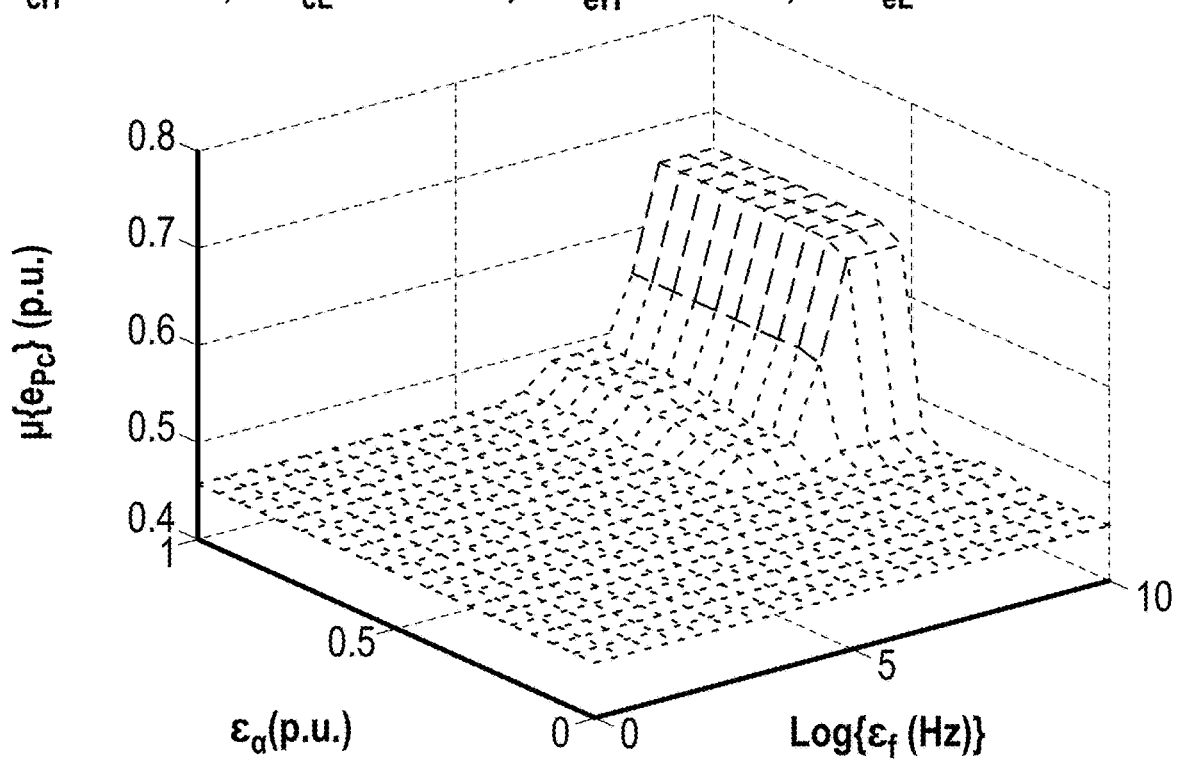
Figure 21N:
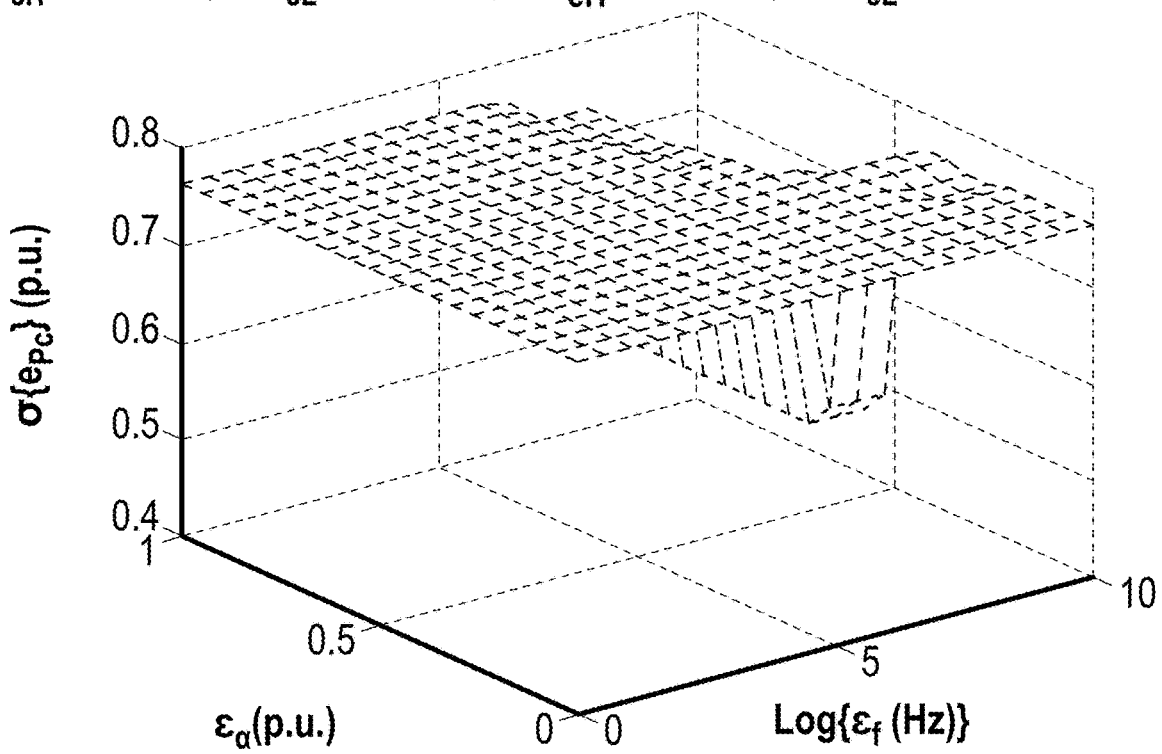
Figure 21O:
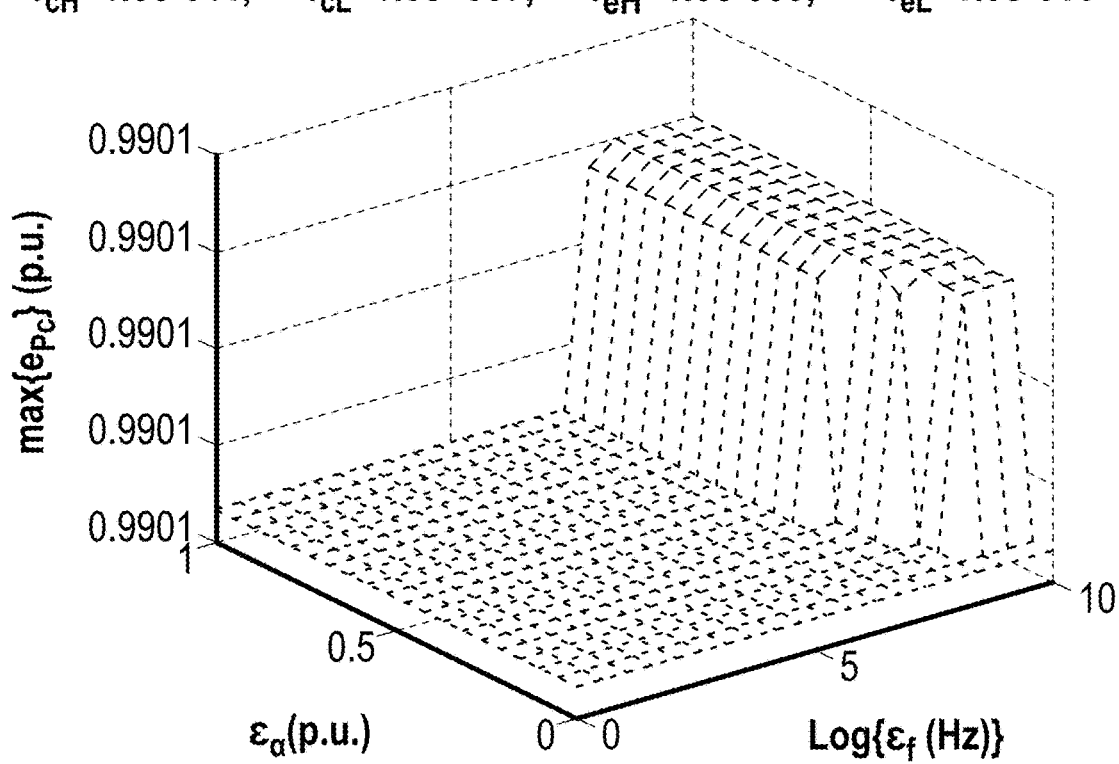
Figure 22A:
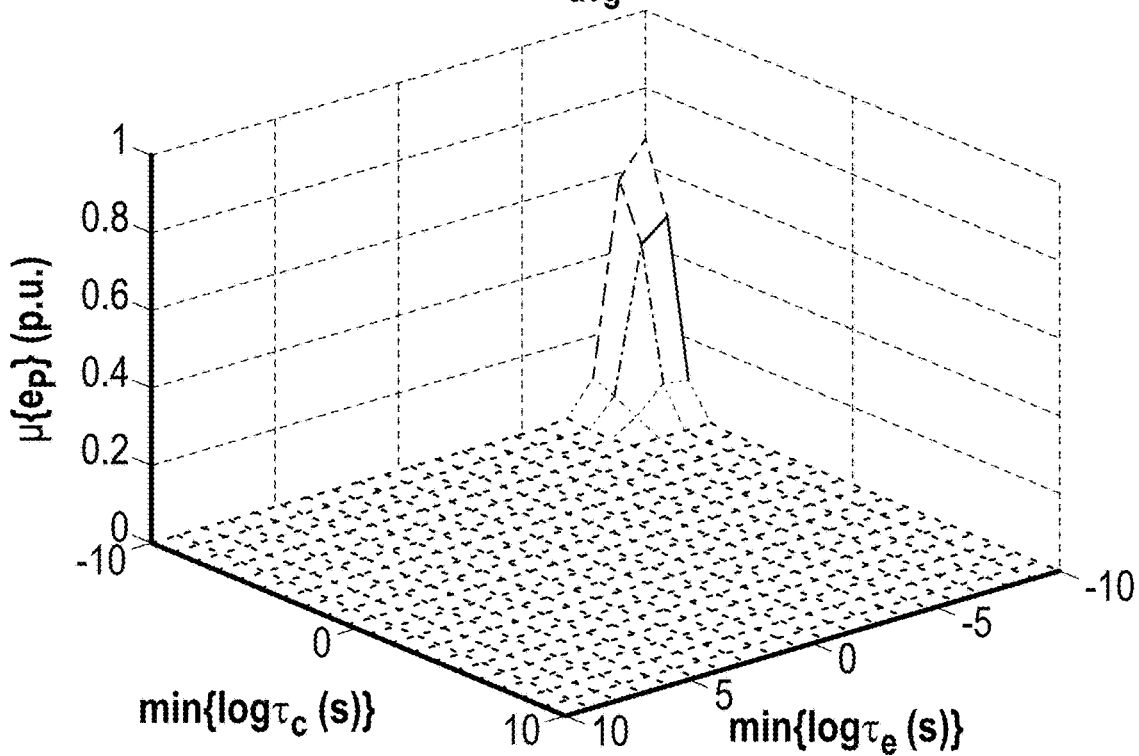
FIGS. 22A-22I illustrate benchmarking results of a single iteration of Equation (17) on bit streams of different average frequencies $f_{avg}$ of the bit stream. The error of the model according to embodiments of the disclosed technology is restricted to even smaller defect subsets as $f_{avg}$ is increased.
Figure 22B:
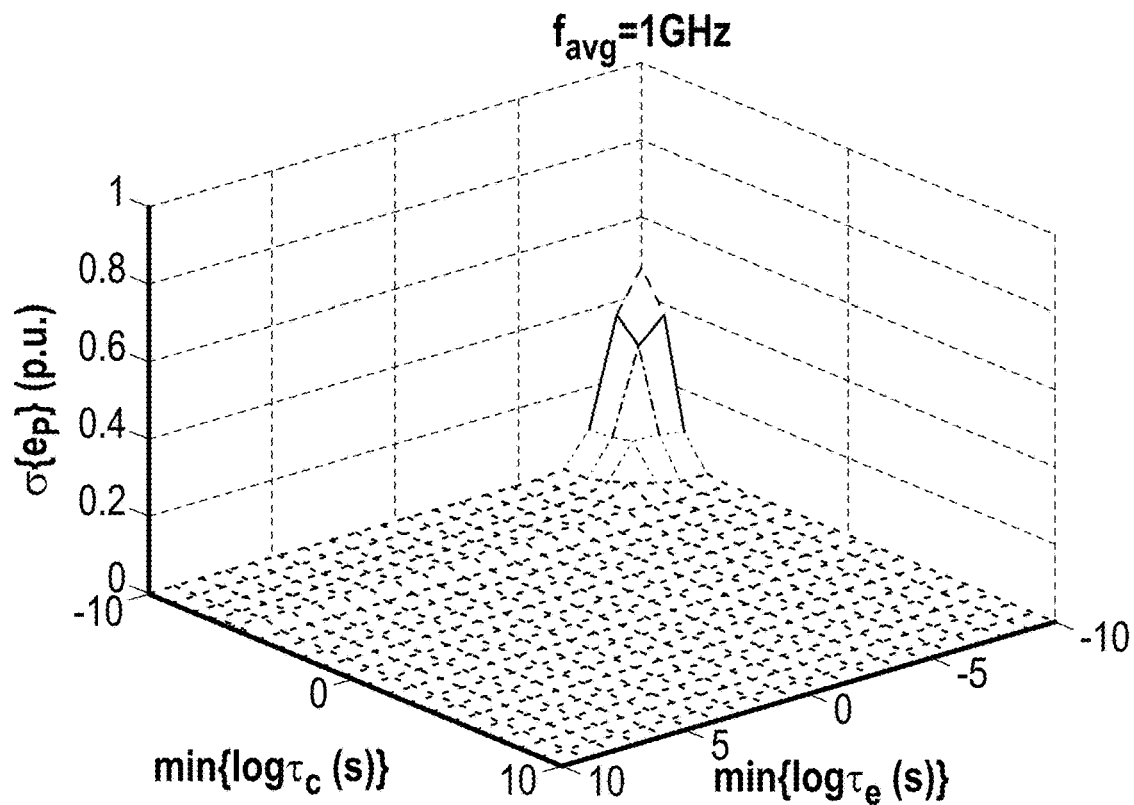
Figure 22C:
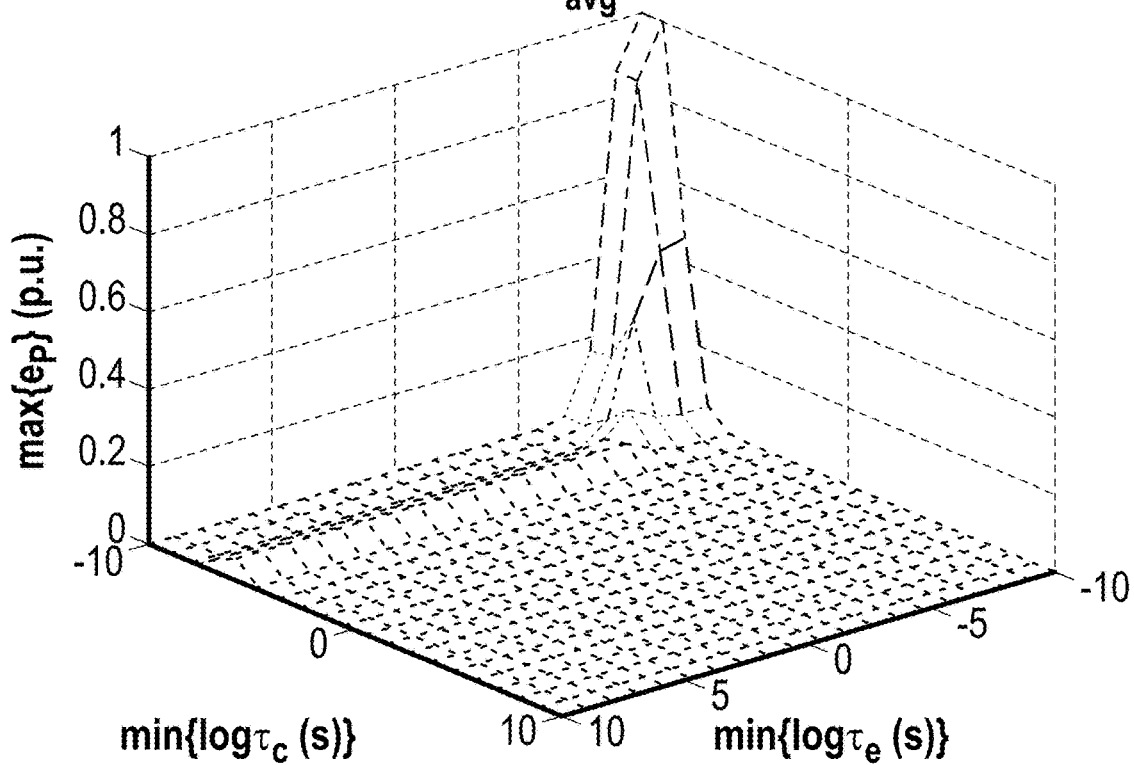
Figure 22D:
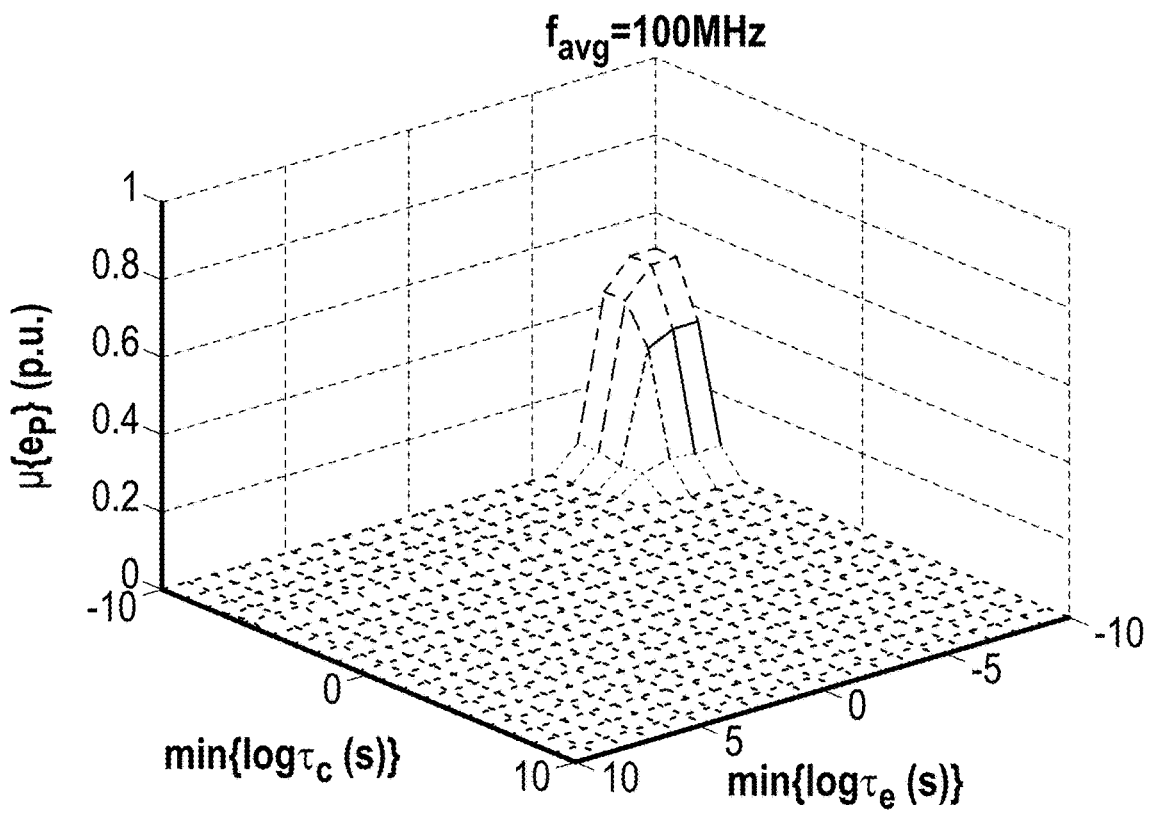
Figure 22E:
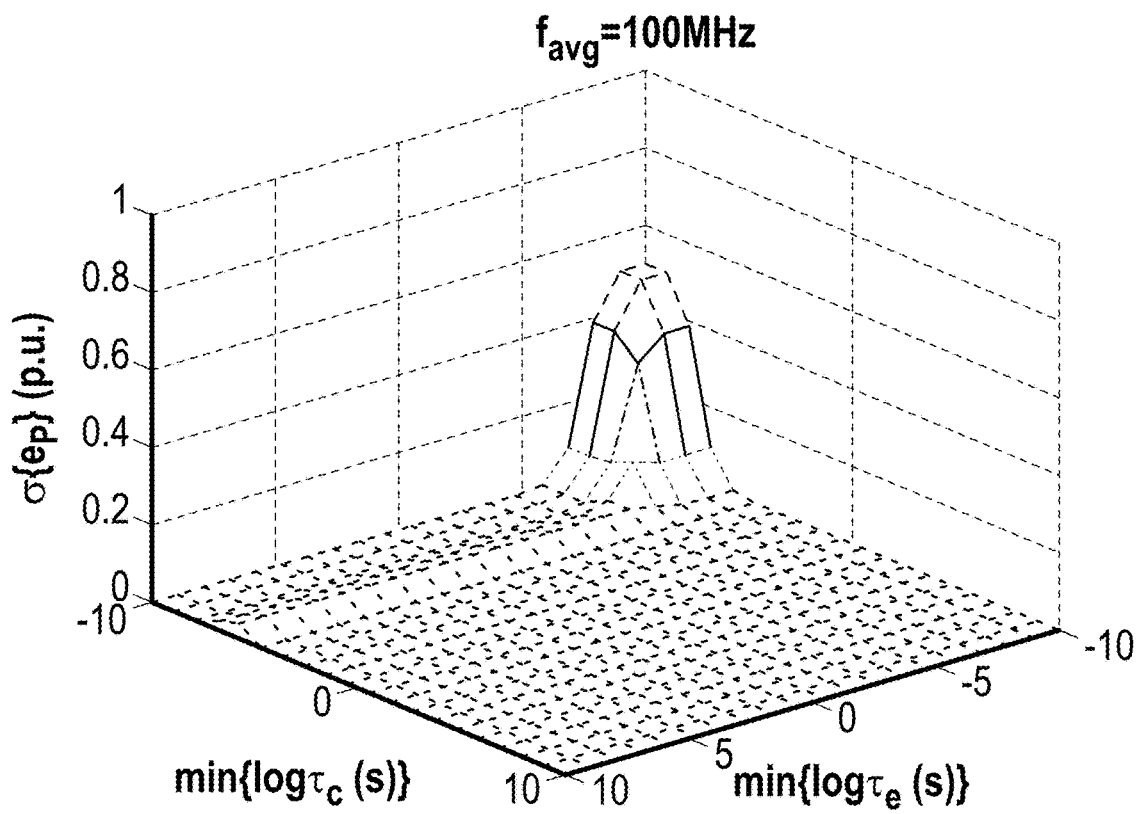
Figure 22F:
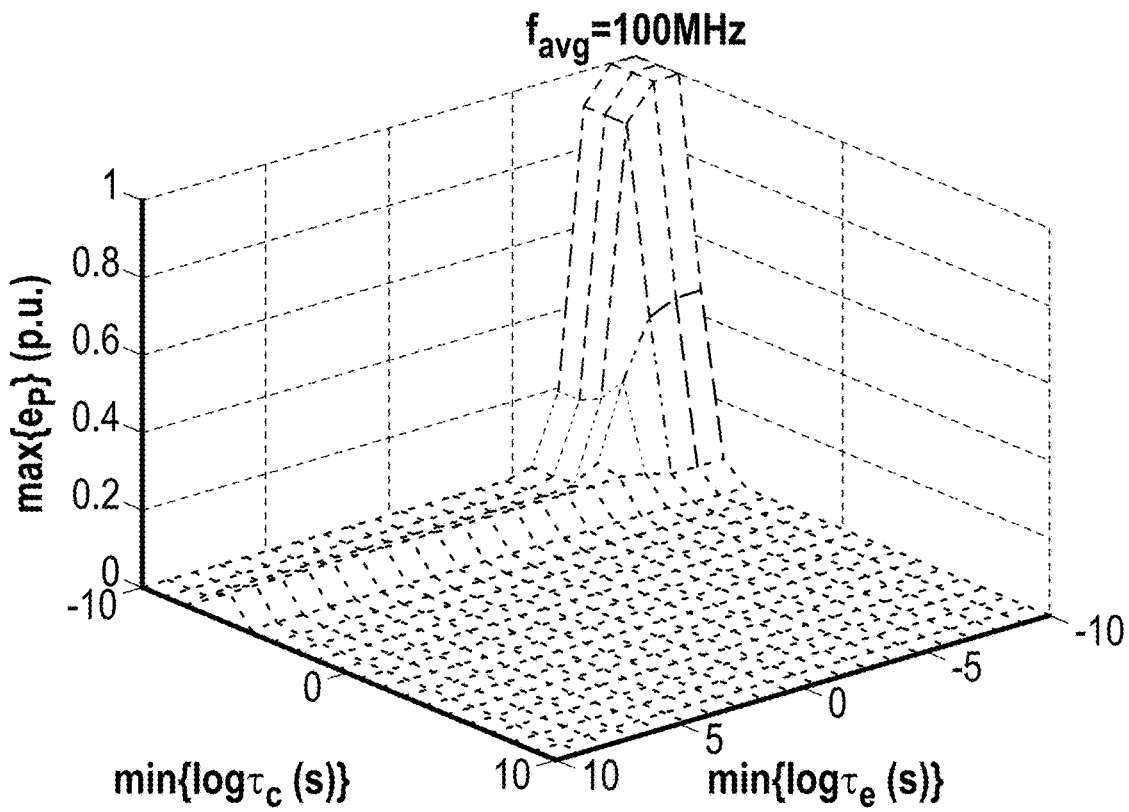
Figure 22G:
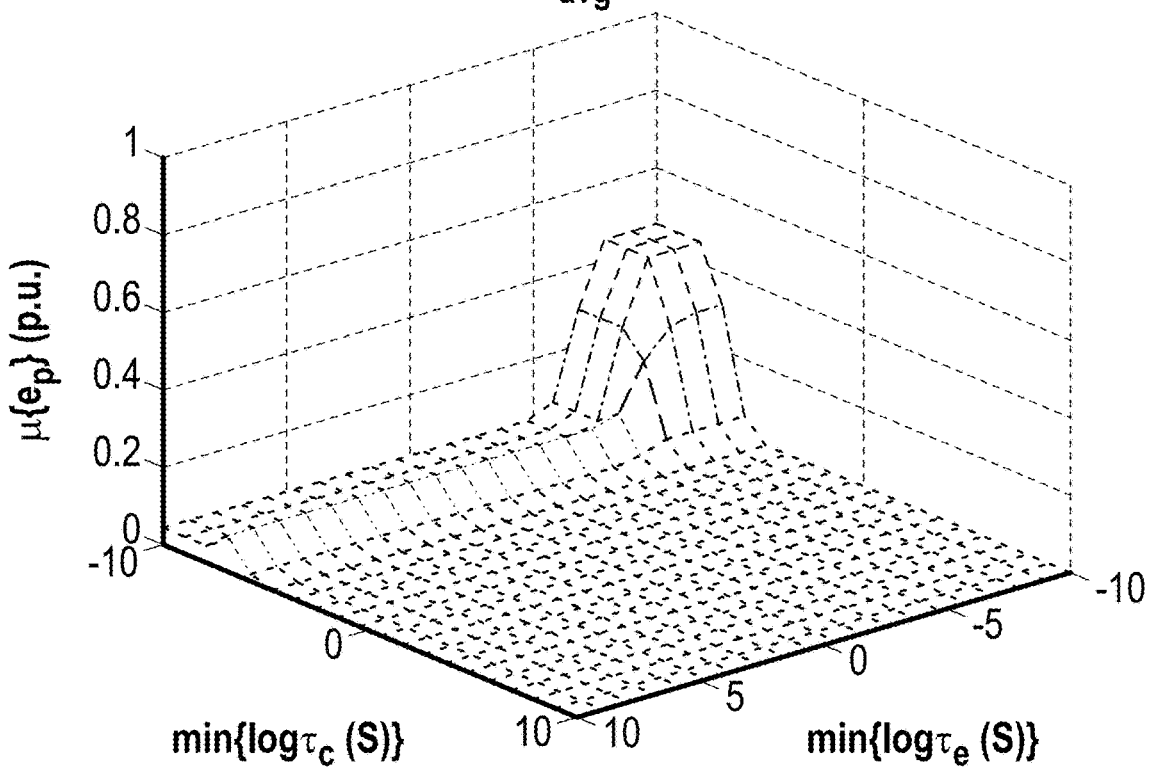
Figure 22H:
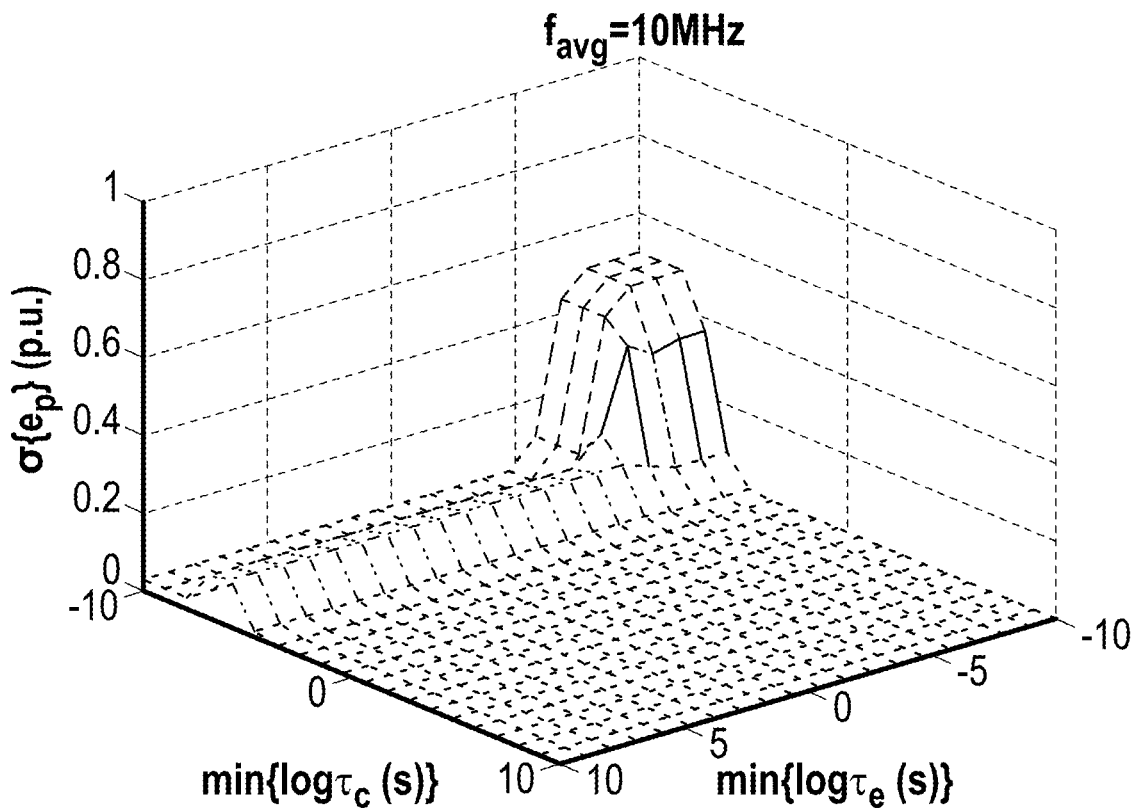
Figure 22I:
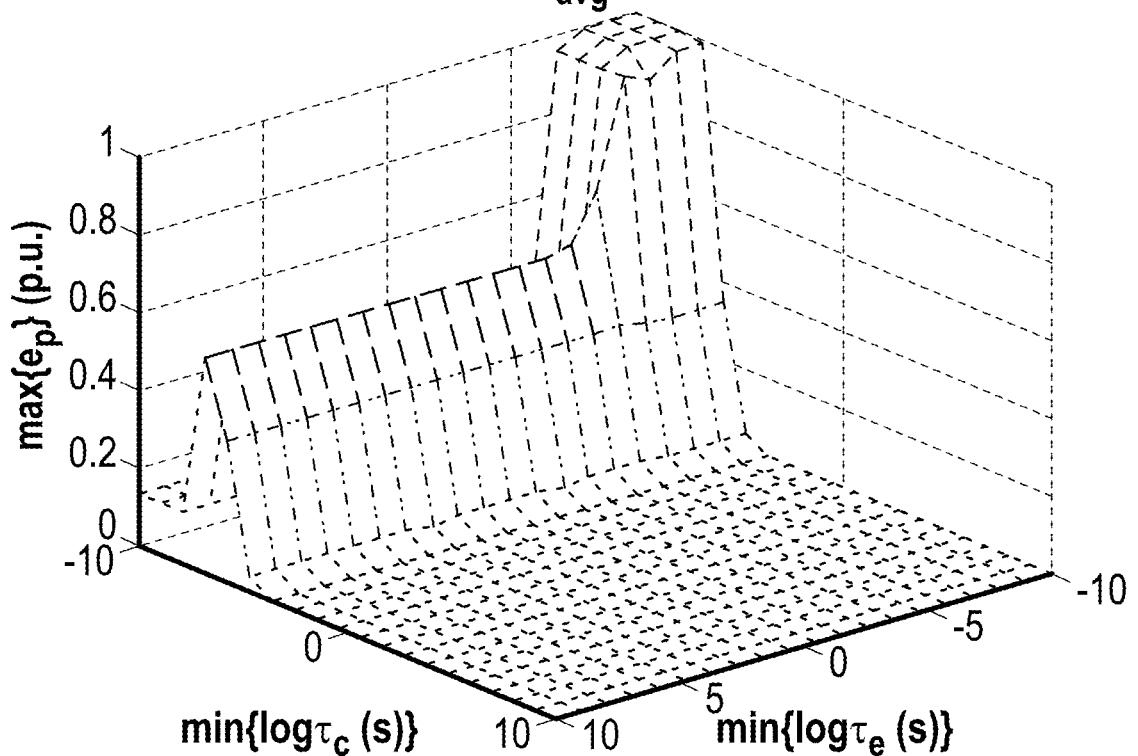

Five different cases are used, ranging from "fast" ($\tau_{cH}=10^{-11}$ s) to "slow" ($\tau_{cH}=10^{-3}$ s) defects. That way, the mean, standard deviation and maximum of $e_p$ across the 100 signals can be calculated for various values of ($\varepsilon_f$, $\varepsilon_\alpha$) and for the five different defects (FIGS. 21A-21O).

A direct correlation exists between how "fast" a defect is and the average frequency of the $V_{gs}$ bit stream ($f_{avg}$). More specifically, the defects that are significantly "slower" in comparison to the average frequency of the bit stream are accurately modeled, regardless of the compression imposed by the concept of the waveform approximation according to embodiments of the disclosed technology (FIGS. 21A-21I). The last two defects (FIGS. 21J-21O) have time constants comparable to the bit stream's period ($1/f_{avg}$). The proposed model is unable to follow the capture probability $P_c$ of these defects, irrespective of $\varepsilon_f$ and $\varepsilon_\alpha$ values.

The relation between the average frequency $f_{avg}$ of the bit stream and the defect time constants has been identified earlier; however, no comprehensive study has been performed for the accuracy limitations of the AC BTI/RTN model. Given that a version of this model, enhanced with workload memory, is the kernel of the simulation methodology according to particular embodiments of the disclosed technology, its accuracy limitations for each model iteration can be exhaustively explored. More specifically, it is important to identify for which defects and under which conditions the accuracy of a model according to embodiments of the disclosed technology is acceptable.

In order to conclude on the accuracy limitations of an approach according to embodiments of the disclosed technology, first a set of 400 different defects is created, with time constants ($\tau_{cH}$, $\tau_{cL}$, $\tau_{eH}$, $\tau_{eL}$) uniformly distributed in the logarithmic scale. The defects are arranged in a two dimensional plane according to min-km, $\{\tau_{cH}, \tau_{cL}\}$ and min $\{\tau_{cH}, \tau_{eL}\}$.

Three sets of bit streams with average frequency $f_{avg}$ equal to 1 GHz, 100 MHz and 10 MHz are used for each set. Each set contains 100 signals, each one with a duration of 1 μs. Each signal is CDW-approximated with maximum compression ($\varepsilon_f \to +\infty$ and $\varepsilon_\alpha \to 1$) and $e_p$ is calculated according to Equation (18). That way, $\mu\{e_p\}$, $\sigma\{e_p\}$ and $\max\{e_p\}$ can be calculated for each defect and for each case with the selected average frequencies $f_{avg}$. The results are shown in FIGS. 22A-22I. It is relevant to note that these results represent the accuracy of the proposed model for a single iteration of Equation (17). However, they also provide useful insight on the accuracy limitations of the proposed model, when using it for an arbitrary number of iterations.

For all average frequency values $f_{avg}$, a subset of defects can always be found that cannot be accurately modelled. As the average frequency $f_{avg}$ is increasing, this subset is reduced and an acceptable accuracy of the model according to embodiments of the disclosed technology spreads to more defect time scales. For the case of $f_{avg}=1$ GHz, the model according to embodiments of the disclosed technology can accurately simulate all defects that satisfy min $\{\tau_{cH}, \tau_{cL}\} \geq 10^{-7}$ s and min $\{\tau_{cH}, \tau_{eL}\} \geq 10^{-7}$ s.

With dynamic voltage and frequency scaling (DVFS) being increasingly common among modern ICs, it is relevant to also include the impact of voltage bias on the BTI simulation. Furthermore, aggressive integration may also cause significant thermal gradients across an IC. As a result, the BTI simulator can also be aware of the local temperature conditions. It has been previously demonstrated that the time constants of BTI/RTN defects are affected by the operating bias ($V_{dd}$) and temperature conditions. Based on state-of-the-art measurements, two orthogonal scaling rules of a time constant are proposed, in view of temperature and bias variations (see Equations (20) and (21)):

$$\mathcal{V}(\tau_0) = \log\{\tau\} = 2 \times (V_{dd,0} - V_{dd}) + \log\{\tau_0\} \quad (20)$$

$$\mathcal{T}(\tau_0) = \log\{\tau\} = \frac{T_0 - T}{50} + \log\{\tau_0\} \quad (21)$$

Figure 23A:
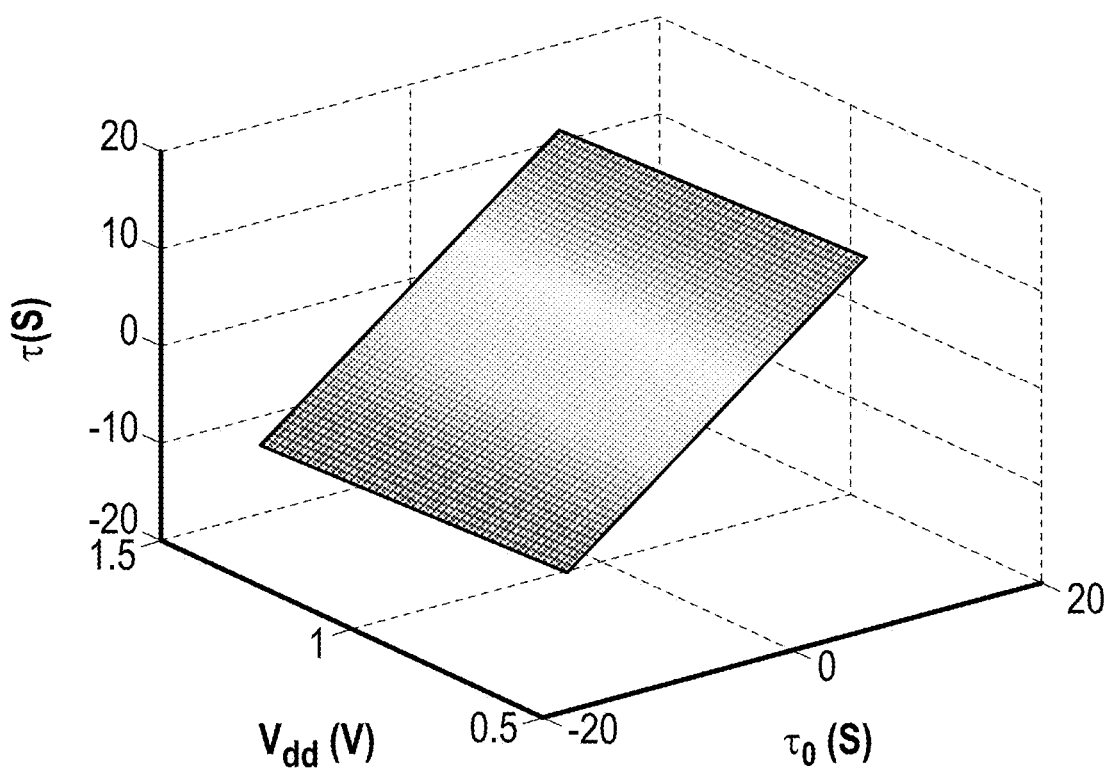
FIG. 23A illustrates scaling defect time constants for various bias (Vdd) conditions, according to Equation (19).
Figure 23B:
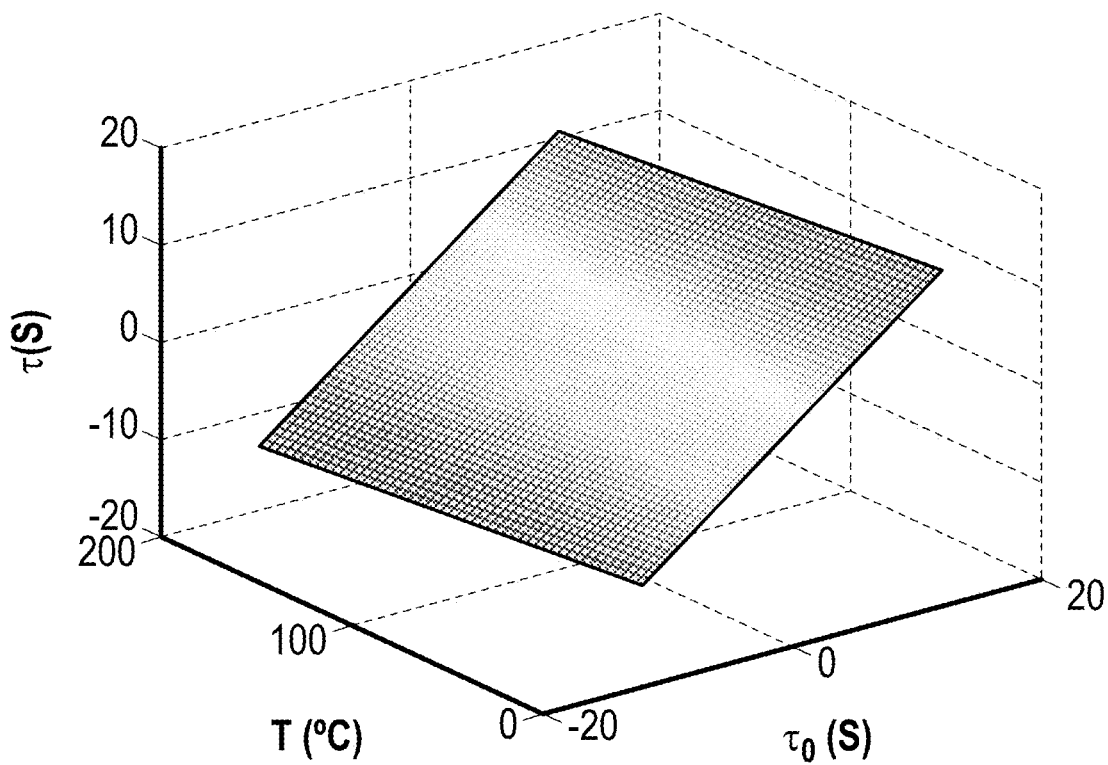
FIG. 23B illustrates scaling defect time constants for various temperature (T) conditions, according to Equation (20).

These rules constitute a first order approximation of time constant scaling, as observed in measurements from real devices. It can be seen that in each case, the new time constant ($\tau$) depends on its original value ($\tau_0$), as well as the original and new value of bias ($V_{dd,0}$ and $V_{dd}$) or temperature ($T_0$ and $T$), respectively. The original temperature ($T_0$) and bias ($V_{dd,0}$) values refer to the conditions under which the time constant measurement was performed on a sample of devices from a specific technology node. The scaling factors (−2 for bias and −1/50 for temperature) are also technology dependent. An example of bias and temperature scaling (applied individually) appears in FIG. 23A and FIG. 23B, respectively, for an initial temperature $T_0=125°$ C. and an initial bias condition $V_{dd,0}=1$ V.

Figure 24:
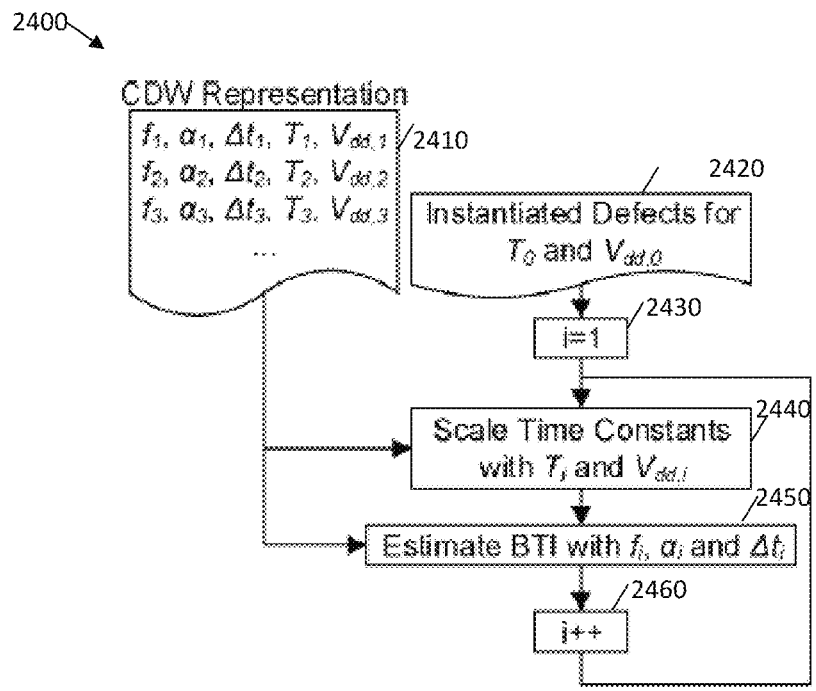
FIG. 24 is a flow chart illustrating that, before resolving occupancy of defects with the CDW, in accordance with embodiments of the disclosed technology, time constants may be scaled.

It is easy to prove that the scaling operators $\mathcal{V}$ and $\mathcal{T}$ maintain a commutative composition, thus they can be applied in an arbitrary sequence. Equations (20) and (21) require an extension of the CDW representation in order to include bias and temperature information. Thus, before the occupancy of the defects is resolved, the time constants can be scaled appropriately (see, for example, the flowchart of method 2400 in FIG. 24). The flowchart includes data block 2410 which provides a CDW representation, and data block 2420, which provides initial instantiated defects. In block 2430, method 2400 initializes loop counter i, for a loop including blocks 2440, 2450, and 2460. In block 2440, method 2400 scales time constants with Ti and $V_{dd,i}$ from data block 2410. In block 2450, method 2400 estimates BTO with $f_i$, $g_i$, and $\Delta t_i$ from data block 2410. In block 2460, method 2400 increments loop counter i.

It should be noted that temperature scaling affects all four time constants. Bias affects only the time constants that refer to a non-zero voltage, namely $\tau_{cH}$ and $\tau_{eH}$ for the nMOS and $\tau_{cL}$ and $\tau_{eL}$ for the pMOS.

Figure 25:
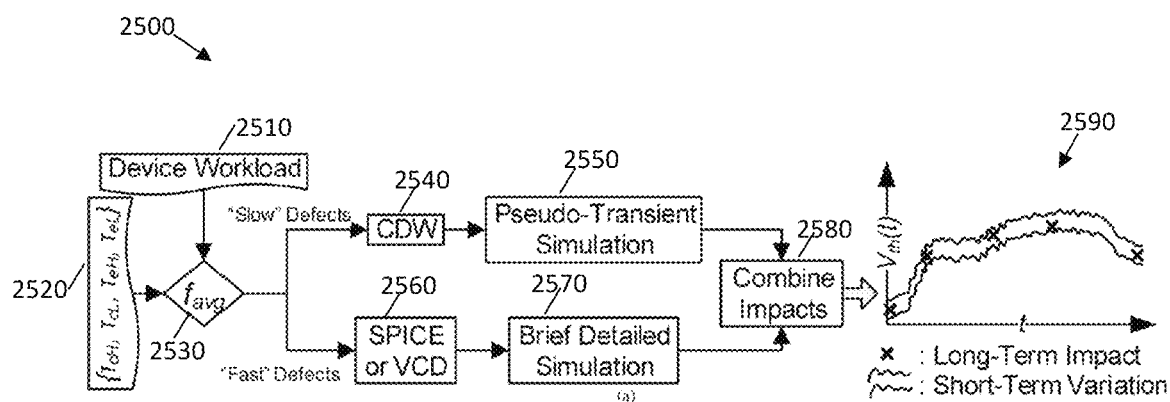
FIG. 25 illustrates application of the concept of pseudo-transient BTI/RTN simulation on a single device. Based on the characteristics of the workload ($f_{avg}$), a split is made between "slow" and "fast" defects. The former class is handled with the pseudo transient simulation tool in accordance with embodiments of the disclosed technology. Defects that are too "fast" to be simulated that way, are monitored with a brief transient simulation.

FIG. 25 illustrates a flowchart of method 2500, of the application of the concept of pseudo-transient BTI/RTN simulation on a single device. Based on the characteristics of the workload ($f_{avg}$) 2530, a split is made between "slow" and "fast" defects. The former class is handled with the pseudo transient simulation tool 2550 in accordance with embodiments of the disclosed technology. Defects that are too "fast" to be simulated that way are monitored with a brief transient simulation 2570.

From the results of the accuracy assessment of BTI evaluation using CDW, it can be seen that, given the time constants of a defect 2520 and the workload of the respective device 2510, it can be identified whether this defect is suitable for pseudotransient simulation 2550 (see FIG. 16).

If that is the case, $V_{gs}$ intervals can be stridden over using a CDW approximation 2540 in accordance with embodiments of the disclosed technology. This course of action (pseudo-transient simulation 2550) involves a few iterations of the proposed BTI/RTN model and comes at a very small CPU overhead. If the defect is too "fast" for the pseudotransient model, a more detailed simulation 2570 (with a SPICE or VCD waveform 2560) is deemed necessary. However, its duration need not cover the entire device lifetime: the impact of fast defects can be seen within a small time interval. For the subset of the "fast" defects, a margin of $V_{th}$ short-term variation can be derived that can be superimposed to the long term BTI/RTN impact derived by the pseudo-transient model. These impacts can be combined in block 2580, resulting in graph 2590 showing long-term impact and short-term variations.

Figure 26:
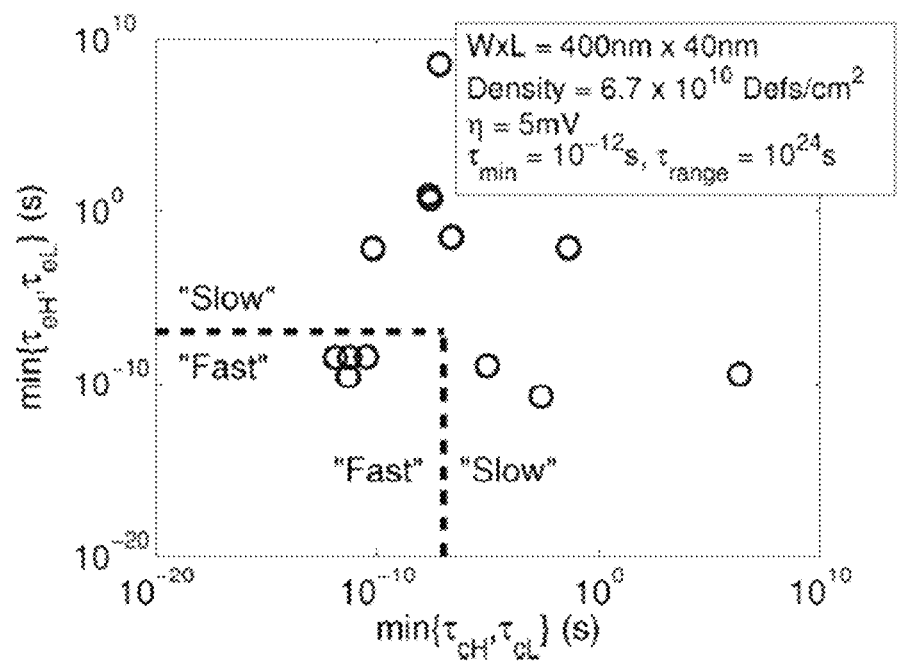
FIG. 26 illustrates the distinction between "fast" and "slow" defects.
Figure 27:
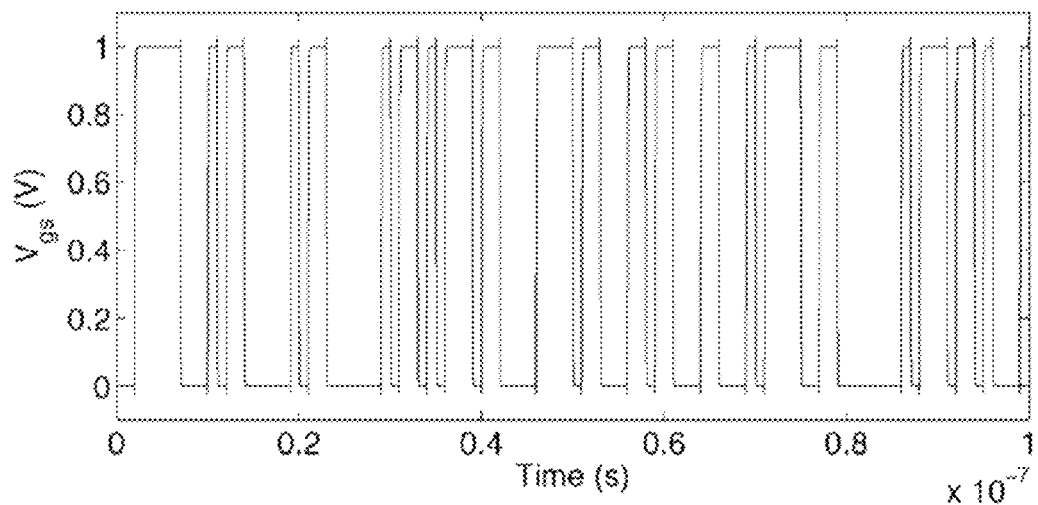
FIG. 27 illustrates short term device workload, which can be used for "fast" defect simulation.
Figure 28:
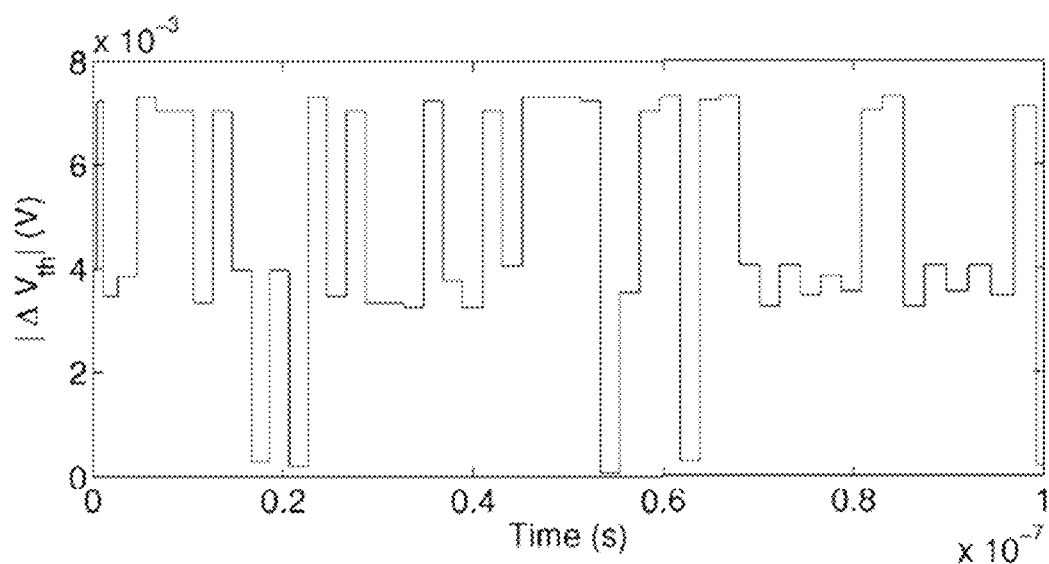
FIG. 28 illustrates short term BTI/RTN impact on the $V_{th}$.

In order to verify the aspects of this methodology, it has been tested on a single device. First, this device has been populated with defects and these have been arranged in the min $\{\tau_{cH}, \tau_{cL}\}$ versus min$\{\tau_{eH}, \tau_{eL}\}$ plane (FIG. 26). A bit stream with $f_{avg}=1$ GHz is assumed as device workload. Given the results of FIGS. 22A-22I, it can be assumed that $10^{-7}$ s is the boundary between fast and slow defects. For the "fast" defects, a sample SPICE waveform may be used, representative of the device workload (FIG. 27). With a brief simulation that covers the "fast" time constants, the short-term impact of the respective defects can be obtained (FIG. 28). For the long-term impact of BTI/RTN, a CDW representation of the device lifetime (until $10^8$ s) is created using 100 points. As a result, each point has $f_{avg}=1$ GHz and $\Delta t=10^6$ s. What varies between CDW points is the duty cycle $\alpha$, which is visualized in FIG. 27. The long term BTI/RTN impact is calculated using the model of Equation (17) and can be combined with the worst case impact of "fast" defects (FIG. 28).

The device workloads presented above are artificial. However, they can be easily derived from industry standard tools when handling realistic circuits and applications. A brief SPICE simulation of the target circuit can produce a representative workload for the "fast" defect simulation. $\alpha$ values for different circuit operation modes can be easily derived using timing analysis tools. The above methodology has no interdevice dependencies and can be generalized to a larger device inventory. This data parallelism is highly compatible with the multi-/many-core paradigm observed in the computing infrastructure of modern design houses.

Given that the CDW signal representation according to embodiments of the disclosed technology leads to an acceleration of electronic circuit simulation, e.g., BTI simulation, across device lifetime, it is good to reflect on the usability of the proposed framework for realistic circuits. As an example, the accurate estimation of functional yield of a circuit over three years of operation is explored.

Figure 29:
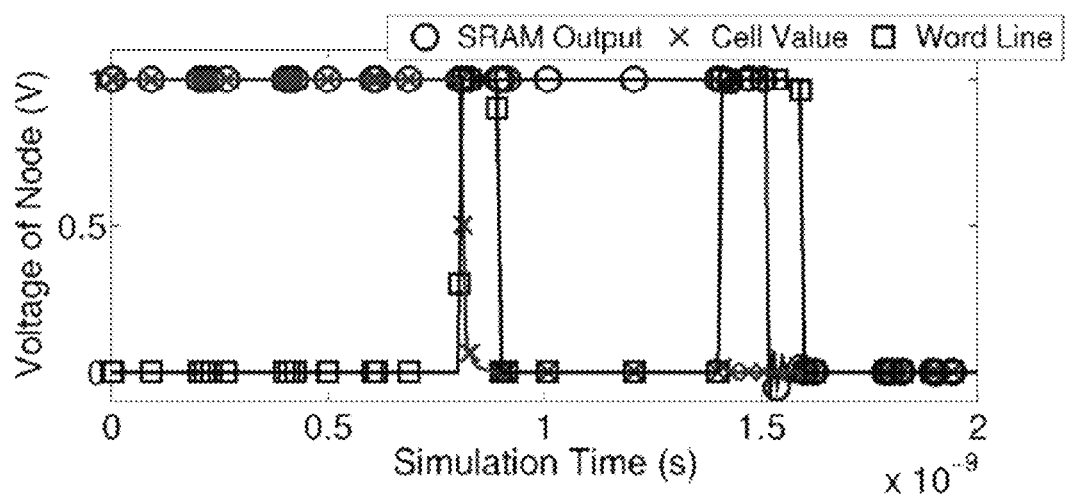
FIG. 29 illustrates the functionality criterion when using pseudo-transient BTI analysis for the estimation of time-dependent functional yield of an SRAM circuit.

A subset of an embedded static random access memory (SRAM) is used, isolating a representative path, from a memory cell to the SRAM's input/output ports. This exemplary circuit contains 63 devices and it supports reading and writing of the cell. A sample of this design is defined as functionally correct if a zero value can be written and then read successfully (FIG. 29). The functional yield of the target circuit is estimated, namely the percentage of samples that exhibit correct functionality. Derivation of such metrics is of major importance at design time and many methodologies exist solving this problem. Given the inherent time- and workload-dependency of the proposed model according to embodiments of the disclosed technology, the functional yield can be estimated at different instances of circuit lifetime.

The evolution of $V_{th}$ is perceived for each device according to Equation (22):

$$V_{th}(t)=V_{th,TZ}+\Delta V_{th,TD}(t), \text{ where: } V_{th,TZ}\sim\text{Norm}(\mu_0,\sigma_0)$$
$$\text{and } \Delta V_{th,TD}\sim\text{AtomisticModel}. \quad (22)$$

$V_{th,TZ}$ represents the time-zero component of $V_{th}$ fluctuations, whereas $V_{th,TD}$ represents the time-dependent counterpart. The former component is constant throughout the device lifetime but varies across device samples. In the context of the current invention, the latter component is attributed solely to BTI. $V_{th,TD}$ is a function of time and varies across different device samples. The atomistic model for $V_{th,TD}$ is configured according to TABLE 2 and is solved in a pseudo-transient way. Table 2 lists atomistic model configuration parameters for yield analysis of the target SRAM circuit, according to BTI/RTN measurement as disclosed by M. Toledano-Luque et al. in "Response of a single trap to AC negative bias temperature stress", Proc. IEEE IRPS, 2011, pp. 4A.2.1-4A.2.8, and the 90 nm predictive technology model disclosed at http://ptm.asu.edu/.

TABLE 2

| Parameter | | Distribution |
|---|---|---|
| $V_{th,TZ}$ | Time-Zero pFET | $V_{th,TZ}\sim$Norm (−0.339 V, −0.033 V) |
| | Time-Zero nFET | $V_{th,TZ}\sim$Norm (0.397 V, 0.04 V) |
| $\Delta V_{th,TD}$ (t) | Defects per pFET | $N_p\sim$Pois ($\lambda = 10^{11} \times$ Area[cm$^2$]) |
| | Defects per nFET | $N_n\sim$Pois ($\lambda = 6.7 \times 10^{10} \times$ Area[cm$^2$]) |
| | Time Const. | $\log_{10}\{\tau^*_{pV}\}\sim$Unif (a = −12, b = 12) |
| | $\Delta V_{th}$ per | $\Delta V_{th}\sim$Exp ($\eta = 5$), |
| | Defect (mV) | for pFETs and nFETs alike |

*p: process, either capture (c) or emission (e)
V: voltage, either high (H) or low (L)

Figure 30:
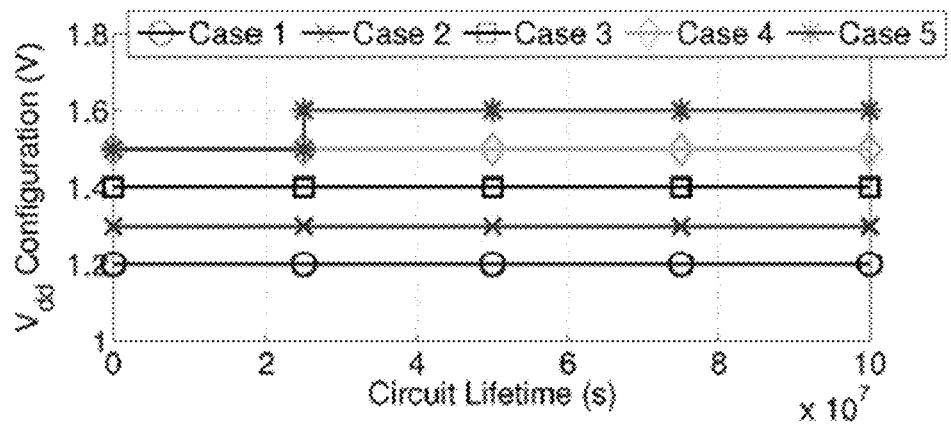
FIG. 30 illustrates five different workloads, with regard to voltage supply when using pseudo-transient BTI analysis for the estimation of time-dependent functional yield of an SRAM circuit.

To emphasize on the workload memory/dependency of the proposed flow, five different cases are assumed in terms of voltage supply for the test case circuit (FIG. 30). Such settings cover the $V_{dd}$ parameter of the CDW. It is assumed that the test case circuit operates at a 1 GHz frequency, executing iteratively the functionality criterion test of FIG. 29 (namely the write 0→read 0 sequence of operations). Knowledge of this activity can provide the $\alpha$ and f parameters of the CDW for each device of the circuit using the waveform approximation tools according to embodiments of the disclosed technology. The inspected lifetime is about 3 years ($10^8$ s) and is split in intervals of $2.5\times10^7$ s (which is used as the $\Delta t$ parameter of the CDW). Finally, the temperature is fixed at a reference value of 50° C. for all the simulations.

The functional yield of the circuit is estimated for all five $V_{dd}$ cases and the 95% confidence interval is also provided based on 150 Monte Carlo iterations for each case. The execution time has been measured at roughly 3 hours of processing per 150 Monte Carlo iterations on a desktop computer with an Intel Core 2 Quad processor operating at 2.66 GHz. Each iteration starts with initialization of $V_{th,TZ}$ (from the normal distribution) and of the gate stack defects (based on the atomistic model). At each time step, $V_{th,TD}$ is evaluated per device and the circuits functionality is tested.

For the sake of brevity, the impact of the "fast" defects on the functional yield analysis has been ignored. Apart from being covered by previous work, we have refrained from transient BTI/RTN simulations, since they can be incorporated to the time-zero (and ever present) variations of $V_{th}$ by adding a "safety" margin. Significant work exists in experimentally delivering yield and failure metrics for SRAMs, strictly due to "fast" defect activity. However, until now and to the best of the inventors' knowledge a time- and workload-dependent yield analysis of memory circuits as in accordance with embodiments of the disclosed technology has never been performed with the atomistic BTI model for the entire circuit lifetime.

Figure 31:
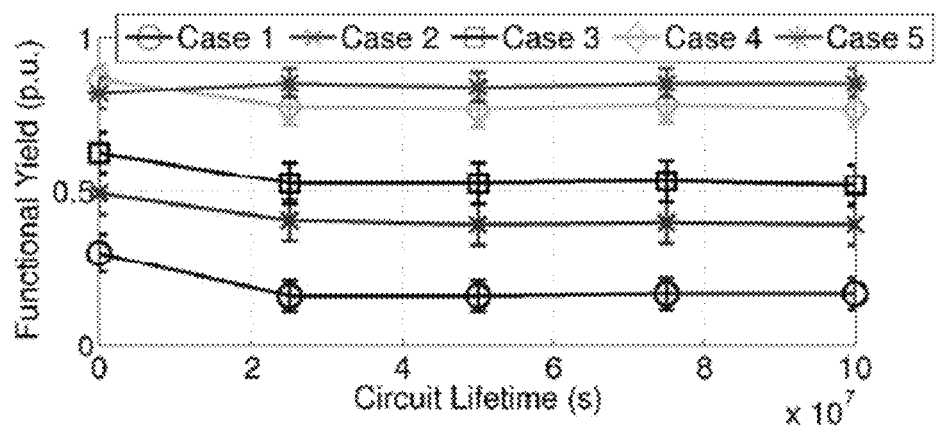
FIG. 31 illustrates the functional yield of a memory at various instances of circuit lifetime, for five different workload classes (static and dynamic $V_{dd}$ configurations).
Figure 32:
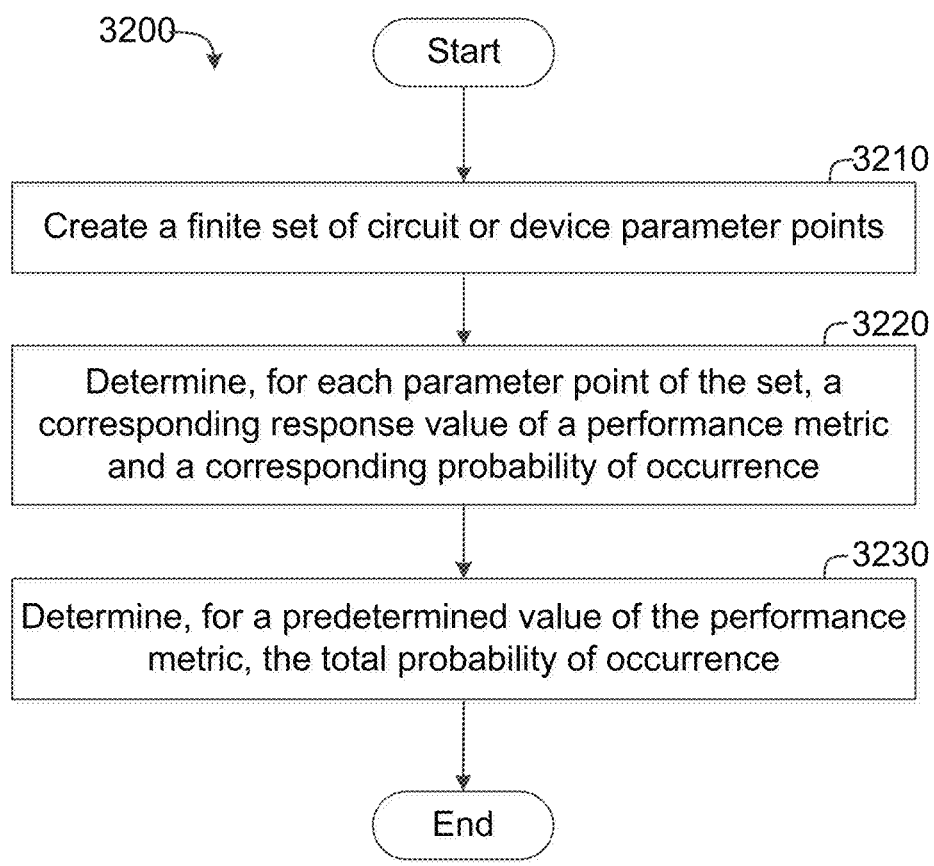
FIG. 32 is a flowchart illustrating a method for simulating an electronic circuit according to the disclosed technology.

The yield estimations of FIG. 31 provide useful hints towards time-zero and time-dependent variability mitigation. It can be observed that at a constant $V_{dd}$, the target circuit degrades aggressively within the first $2.5 \times 10^7$ s lifetime interval. Afterwards, the yield shows minimal fluctuation. This is expected, considering that the defect capture time constants are uniformly distributed across the logarithmic scale. It is obvious that constant voltage supply is unable to keep the yield of the circuit at acceptable levels. On the contrary, a dynamic $V_{dd}$ configuration (namely Case 5 of FIG. 31) leads to a more acceptable yield profile. Finally, the BTI amplification due to elevated voltage supply appears to be overwhelmed by the reliability enhancement due to increased overdrive.

The proposed pseudo-transient, atomistic simulation scheme for BTI according to embodiments of the disclosed technology is a major enable for a thorough yield analysis. By retaining the time dependency of the atomistic model, the evolution of functional yield can be monitored throughout the circuit lifetime. Based on the model's workload dependency, dynamic alterations to the circuits workload can be tested and their impact on the functional yield can be observed. Such capabilities are very welcome for the design of reliable ICs, especially at aggressively downscaled technologies.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the invention described herein can be embodied within a form that does not provide all of the features and benefits set forth herein, as some features can be used or practiced separately from others. The scope of the invention disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A method comprising:
   providing a frequency error margin value and a duty cycle error margin value associated with processing a digital signal having a transient waveform that comprises a sequence of pulses, each pulse having a pulse frequency, a pulse duty cycle, and a pulse duration;
   identifying a buffer frequency, a buffer duty cycle, and a buffer duration of one of a plurality of sub-sequences of pulses, wherein each sub-sequence of pulses comprises one or more pulses, and wherein for the one of the sub-sequences of pulses:
      the buffer frequency is a first function of the pulse frequencies of the sub-sequence of pulses, such that the buffer frequency and each of the pulse frequencies of the sub-sequence of pulses differ by less than the frequency error margin,
      the buffer duty cycle is a second function of the pulse duty cycles of the sub-sequence of pulses, such that the buffer duty cycle and each of the pulse duty cycles of the sub-sequence of pulses differ by less than the duty cycle error margin, and
      the buffer duration is the sum of the pulse durations over the sub-sequence of pulses;
   representing the sub-sequence of pulses as a point comprising the buffer frequency, the buffer duty cycle, and the buffer duration;
   determining a response value of a performance metric and a probability of occurrence corresponding to the response value, based on the point; and
   designing an electronic circuit based on the probability of occurrence, or driving an electronic circuit with a workload selected based on the probability of occurrence.

2. The method of claim 1, further comprising:
   identifying a next buffer frequency, a next buffer duty cycle, and a next buffer duration of a next sub-sequence of pulses, wherein for the next sub-sequence of pulses:
      the next buffer frequency is the first function of the pulse frequencies of the next sub-sequence of pulses, such that the next buffer frequency and each of the pulse frequencies of the next sub-sequence of pulses differ by less than the frequency error margin,
      the next buffer duty cycle is the second function of the pulse duty cycles of the next sub-sequence of pulses, such that the next buffer duty cycle and each of the pulse duty cycles of the next sub-sequence of pulses differ by less than the duty cycle error margin, and
      the next buffer duration is the sum of the pulse durations over the next sub-sequence of pulses; and
   representing the next sub-sequence of pulses by the next buffer frequency, the next buffer duty cycle, and the next buffer duration,
   wherein the next sub-sequence of pulses starts from a pulse such that:
      the buffer frequency and the frequency of the pulse differ by an amount equal to or more than the frequency error margin, and/or
      the buffer duty cycle and the duty cycle of the pulse differ by an amount equal to or more than the duty cycle error margin.

3. The method of claim 2, wherein the buffer frequency, buffer duty cycle, and buffer duration representing each of the sub-sequences of pulses forms a compact digital waveform (CDW) point for the corresponding sub-sequence of pulses, and the method further comprises:
   storing a representation of the digital signal as a series of CDW points, each CDW point being representative of one of the plurality of sub-sequences of pulses.

4. The method of claim 3, wherein the buffer frequencies, buffer duty cycles, and buffer durations of the CDW points differ between two CDW points.

5. The method of claim 1, wherein the first function is an average.

6. The method of claim 5, wherein the second function is an average.

7. The method of claim 1, wherein the signal is represented in Simulation Program with Integrated Circuit Emphasis (SPICE) format.

8. The method of claim 1, wherein the signal is represented in Value Change Dump (VCD) or equivalent format.

9. The method of claim 1, wherein the buffer frequency, buffer duty cycle, and buffer duration representing each of the sub-sequences of pulses forms a compact digital waveform (CDW) point for the corresponding sub-sequence of pulses, and the method further comprises:
   storing a representation of the digital signal as a series of CDW points, each CDW point being representative of one of the plurality of sub-sequences of pulses.

10. The method of claim 9, wherein the buffer frequencies, buffer duty cycles, and buffer durations of the CDW points vary over time.

11. The method of claim 1, wherein the digital signal is a voltage applied to a gate terminal of a transistor as a function of time.

12. The method of claim 11, wherein the transistor is a p-channel metal—oxide—semiconductor field-effect transistor, n-channel metal—oxide— semiconductor field-effect transistor, junction field effect transistor, high electron mobility transistor, or insulated-gate bipolar transistor.

13. The method of claim 1, wherein the digital signal is a voltage applied to an input port of a logic cell of a circuit or device as a function of time, the circuit or device comprising a plurality of logic cells.

14. The method of claim 13, wherein the logic cell is a memory cell of static random-access memory (SRAM).

15. The method of claim 1, wherein the pulse frequencies and the pulse duty cycles of the sequence of pulses vary over time.

16. The method of claim 1, wherein the response value of the performance metric and the probability of occurrence corresponding to the response value are determined based on the point and on one or more additional points representing additional sub-sequences of the plurality of sub-sequences of pulses.

\* \* \* \* \*

UNITED STATES PATENT AND TRADEMARK OFFICE
CERTIFICATE OF CORRECTION

PATENT NO. : 11,704,462 B2
APPLICATION NO. : 16/522555
DATED : July 18, 2023
INVENTOR(S) : Pieter Weckx et al.

It is certified that error appears in the above-identified patent and that said Letters Patent is hereby corrected as shown below:

In the Specification

At Column 2, Line 1, delete "6σ;" and insert -- 6σ; --.

At Column 2, Line 20 (approx.), delete "$H_{\eta,N_T} = (\Delta V_{TH}) =$" and insert -- $H_{\eta,N_T}(\Delta V_{TH}) =$ --.

At Column 6, Line 22, delete "g(ξ)" and insert -- g(ξ). --.

At Column 6, Line 33, delete "$g_i$(ξ)" and insert -- $g_i$(ξ), --.

At Column 12, Line 2, delete "SNM(ξ)" and insert -- SNM(ξ), --.

At Column 13, Line 66, delete "g(ξ)" and insert -- g(ξ), --.

At Column 16, Lines 28-35, delete "It will be assumed that the VCD format includes only the high (Vdd) and low (Vss) levels; however, the VCD standard does support multiple Vdd representations, and thus, the input can be perceived as a succession of low and high voltage levels, e.g., a sequence of AC pulses that have, in the general case, varying f and a values. As the digital signal is scanned, a buffer accumulates pulses that satisfy Equation (14):" and insert the same on Column 16, Line 27, as a continuation of the same paragraph.

At Column 16, Line 37, delete "$f^\frown$" and insert -- $\hat{f}$ --.

At Column 17, Line 22, delete "$e_s$(T)" and insert -- $e_s$(t) --.

At Column 20, Line 51, delete "($f_{ang}$)" and insert -- ($f_{avg}$) --.

At Column 22, Line 24, delete "Time Const." and insert -- Time Const. per Defect (s) --.

Signed and Sealed this
Twenty-first Day of November, 2023

Katherine Kelly Vidal
*Director of the United States Patent and Trademark Office*